(12) United States Patent
Keebler et al.

(10) Patent No.: US 9,060,007 B2
(45) Date of Patent: *Jun. 16, 2015

(54) SYSTEM AND METHODS FOR FACILITATING THE SYNCHRONIZATION OF DATA

(71) Applicant: Scribble Technologies Inc., Toronto (CA)

(72) Inventors: Jonathan Keebler, Toronto (CA); Krzysztof Wiercioch, Mississauga (CA)

(73) Assignee: Scribble Technologies Inc., Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/275,124

(22) Filed: May 12, 2014

(65) Prior Publication Data
US 2014/0250243 A1   Sep. 4, 2014

Related U.S. Application Data

(63) Continuation of application No. 13/410,956, filed on Mar. 2, 2012, now Pat. No. 8,762,332.

(60) Provisional application No. 61/449,540, filed on Mar. 4, 2011.

(51) Int. Cl.
*H04L 29/08* (2006.01)
*G06F 17/30* (2006.01)

(52) U.S. Cl.
CPC ...... *H04L 67/1095* (2013.01); *G06F 17/30581* (2013.01); *G06F 17/30575* (2013.01); *G06F 17/30067* (2013.01); *G06F 17/30578* (2013.01)

(58) Field of Classification Search
CPC .................... G06F 17/30581; G06F 17/30575; G06F 17/30067

USPC .......... 709/201, 248, 218; 707/792, 769, 695, 707/622, 621; 715/500.1, 530
See application file for complete search history.

(56) References Cited

U.S. PATENT DOCUMENTS

| 8,327,029 B1 * | 12/2012 | Purser | 709/248 |
| 2004/0054711 A1 * | 3/2004 | Multer | 709/201 |

(Continued)

FOREIGN PATENT DOCUMENTS

GB    2468742 A    9/2010

OTHER PUBLICATIONS

European Extended Search Report, European Application No. 12755563.9, Jul. 22, 2014, 5 pages.

(Continued)

*Primary Examiner* — Le H Luu
(74) *Attorney, Agent, or Firm* — Fenwick & West LLP

(57) ABSTRACT

Methods and systems for facilitating the synchronization of data on two or more user computers, where the data is maintained in a data structure as objects. The system assigns an index to one or more objects maintained in the data structure, wherein each index provides an address for an object within the data structure. The system detects at least one modification to the data, wherein said modification is initiated on a user computer. The system updates one or more objects in the data structure based on the modification. The system creates a representation of the at least one modification, wherein the representation comprises a reference to one or more indexes assigned to the one or more updated objects. The system transmits the representation, wherein the representation is for use in generating a corresponding modification to the data on other user computers.

36 Claims, 11 Drawing Sheets

(56) References Cited

U.S. PATENT DOCUMENTS

| | | |
|---|---|---|
| 2007/0044010 A1* | 2/2007 | Sull et al. .................... 715/500.1 |
| 2007/0186157 A1* | 8/2007 | Walker et al. ................. 715/530 |
| 2009/0150373 A1 | 6/2009 | Davis et al. |
| 2010/0309933 A1 | 12/2010 | Stark et al. |
| 2011/0173235 A1* | 7/2011 | Aman et al. .................. 707/792 |
| 2011/0246503 A1* | 10/2011 | Bender et al. ................. 707/769 |
| 2012/0011106 A1* | 1/2012 | Reid et al. .................... 707/695 |
| 2012/0078942 A1* | 3/2012 | Cai et al. ...................... 707/769 |

OTHER PUBLICATIONS

PCT International Search Report, PCT Application No. PCT/CA2012/050127, Jun. 6, 2012, 5 pages.

PCT Written Opinion, PCT Application No. PCT/CA2012/050127, Jun. 6, 2012, 5 pages.

United States Office Action, U.S. Appl. No. 13/410,956, Oct. 25, 2013, 9 pages.

\* cited by examiner

SYSTEM AND METHODS FOR FACILITATING THE SYNCHRONIZATION OF DATA

CROSS-REFERENCE TO RELATED APPLICATION(S)

This application is a continuation of co-pending U.S. application Ser. No. 13/410,956 filed Mar. 2, 2012, which claims priority under 35 U.S.C. §119(e) to U.S. Provisional Patent Application Ser. No. 61/449,540, "System and Methods for Facilitating the Synchronization of Data," filed Mar. 4, 2011. The subject matter of all of the foregoing is incorporated herein by reference in its entirety.

FIELD

The described embodiments relate to systems and methods for facilitating the synchronization of data on two or more user computers. The described embodiments further relate to publishing modified data.

BACKGROUND

Users can create and aggregate content such as web pages, papers, essays, stories, articles, posts, commentary, reviews, videos, and images, for example, and electronically publish the content for display on other user computing devices. The content may not be static and a user may update and republish the content. Multiple users may work together to create, aggregate, edit, update or moderate content. Multiple users work together to create, aggregate, edit, update or moderate content even when some or all of the users are in remote locations. Accordingly, there exists a need for computing systems and methods that allow remote users to collaboratively create, aggregate, moderate, edit, update and publish content.

SUMMARY

In a first aspect, some embodiments of the invention provide a method for facilitating the synchronization of data on two or more user computers, the data being maintained in a data structure as objects. The method comprises: assigning an index to one or more objects maintained in the data structure, wherein each index provides an address for an object within the data structure; detecting at least one modification to the data, wherein said modification is initiated on a user computer; updating one or more objects in the data structure based on the modification; creating a representation of the at least one modification, wherein the representation comprises a reference to one or more indexes assigned to the one or more updated objects; and transmitting the representation, wherein the representation is for use in generating a corresponding modification to the data on other user computers.

In accordance with some embodiments, the method further comprises generating the corresponding modification to the data on the other user computers using the representation.

In accordance with some embodiments, the method further comprises: determining at least one type of modification for the at least one modification; updating one or more objects in the data structure based on the at least one type of modification; and wherein the representation comprises a reference to the at least one type of modification.

In accordance with some embodiments, the data is editable data.

In accordance with some embodiments, the method further comprises displaying the data and modifications thereto on each of the two or more user computers. In accordance with some embodiments, the data displayed on the user computer at which the modification was detected is editable data.

In accordance with some embodiments, the representation comprises data relating only to the at least one modification to the data.

In accordance with some embodiments, the objects are organized in the data structure as a connected tree of nodes, each node in the tree corresponding to an object. Each node in the connected tree has zero or more parent nodes, zero or more sibling nodes, and zero or more children nodes; and wherein the connected tree comprises a root node having zero parent nodes.

In accordance with some embodiments, an index comprises a unique token.

In accordance with some embodiments, the data structure maintains each object in a position in relation to other objects, and wherein an index comprises a coordinate storing the position of its assigned object in relation to the other objects. The objects may be organized in the data structure as a connected tree of nodes, each node in the tree corresponding to an object; wherein each node in the connected tree has zero or more parent nodes, zero or more sibling nodes, and zero or more child nodes; and wherein the connected tree comprises a root node having zero parent nodes; and wherein a coordinate is defined by at least three other nodes in the tree. The at least three other nodes in the tree may comprise: a previous sibling node in the tree, a next sibling node in the tree, and a parent node in the tree.

In accordance with some embodiments, the at least one type of modification is selected from the group consisting of: deleting an object from the data, adding an object to the data, editing an object of the data, moving an object from a first position to a second position, and changing the data by more than a threshold amount of data.

In accordance with some embodiments, the method further comprises: determining that the at least one type of modification comprises changing the data by more than a threshold amount of data; and wherein the step of creating the representation of the modification comprises: retrieving a copy of the data structure maintaining the data on the user computer at which the modification was detected and initiated; transmitting the copy of data structure to a server; receiving a modified data structure from the server at the user computer at which the modification was detected, wherein the server modified the copy of the data structure by assigning an index to each object that was not previously assigned an index; replacing the copy of the data structure transmitted to the server with the modified data structure; transmitting a copy of the modified data structure; and indicating in the representation that the modified data structure should replace the data structure maintaining the data on the other user computers.

In accordance with some embodiments, the objects comprise one or more text objects defining text data and one or more container objects defining a container for an object, and wherein the server modified the copy of the data structure by wrapping text objects that are not wrapped with container objects.

In accordance with some embodiments, the objects comprise one or more text objects defining text data and one or more container objects defining a container for an object, and wherein the server modified the copy of the data structure by identifying one or more text objects defining text data that is longer than a threshold amount; sub-dividing the identified text objects by sub-dividing the text data of each of the identified text objects into text objects defining text data that is that are less than the threshold amount; modifying the data structure to wrap the divided text objects with container objects.

In accordance with some embodiments, the data comprises editable data and the method further comprises: displaying the data and modifications thereto on each of the two or more user computers; displaying a caret on each user computer displaying the editable data, wherein the caret is operable to move to different positions within the editable data; for each of user computer: before generating the corresponding modification to the editable data, storing a position of the caret; and after generating the corresponding modification to the editable data, displaying the caret at the stored location.

In accordance with some embodiments, wherein, at the computer at which the modification was detected, the coordinate of the assigned index for the one or more objects comprises a previous position and a current position, wherein the previous position is a position of the object in relation to other objects of the data before detecting the modification, and wherein the current position is a position of the object in relation to other objects of the editable data after detecting the modification; and wherein creating a representation of the at least one modification further comprises: identifying one or more objects assigned to an index having a coordinate with a previous position that does not match a current position; indicating in the representation that each of the one or more identified objects should be moved from the previous position to the current position.

In accordance with some embodiments, the method further comprises: determining at least one type of modification for the at least one modification; and determining that the at least one type of modification comprises moving an object from a first position to a second position.

In accordance with some embodiments, creating a representation of the at least one modification further comprises: identifying one or more objects that are not associated with an index; for each of the identified one or more objects: modifying the data structure to assign a new index to the object; determining a position for the object relative to other objects of the editable data; and indicating in the representation that the object should be added to the data at the determined position.

In accordance with some embodiments, creating a representation of the at least one modification using further comprises: identifying an index assigned to an object that no longer exists in the data structure; and indicating in the representation that the object assigned to the identified index should be deleted from the editable data.

In accordance with some embodiments, the data structure associates one or more objects with a previous value before detecting the modification and a current value after detecting the modification, and wherein creating a representation of the at least one modification using further comprises: identifying, from the one or more objects associated with a current value that does not match its previous value before detecting the modification; and indicating in the representation that the identified object has been in edited from its previous value to its new value.

In accordance with some embodiments, each of the objects are configured to be serialized into strings, and wherein the method further comprises: before detecting the modification, storing a first version of each object's serialized string; wherein creating a representation of the at least one modification further comprises: determining a second version for each object's serialized string; identifying an object having a first version of a serialized string that does not match a second version of a serialized string; and indicating in the representation that the object should be changed to the second version of the serialized string.

In accordance with some embodiments, creating a representation of the at least one modification further comprises: identifying two or more objects assigned to the same index; modifying the data structure to assign different indexes to each of the identified two or more objects; indicating in the representation that the two or more identified elements assigned to the same index should be associated with the different indexes.

In accordance with some embodiments, the method further comprises: detecting a plurality of modifications to the editable data; generating a queue of representations by creating a representation for each modification of the plurality of modifications; and sending the queue of representations to the other user computers, the queue of representations for use in generating a corresponding plurality of modifications to the data on the other user computers.

In accordance with some embodiments, the data structure associates one or more objects with a style attribute, and wherein the method comprises stripping style attributes from the one or more objects except those objects where the style attribute has been explicitly allowed.

In accordance with some embodiments, the objects comprise an image object referencing image data and wherein the method comprises: determining that the image data referenced by the image object is stored on an external server; storing a copy of the image data on an internal server; modifying the image object to reference the copy of the image data stored on the internal server; and indicating in the representation that the image object should be changed to reference the copy of the image data stored on the internal server.

In accordance with some embodiments, the objects comprise text objects defining editable text data and wherein the objects comprise container objects defining a container for one or more objects, wherein the container objects are associated with a value, and the method further comprises: traversing each node in the tree of nodes to identify all nodes that have more than one children nodes and at least one child node that is a text object; for each identified node, for all children nodes that are text objects, add a new container object at the position of the text object, and define the text object as the child node to the new container object; and indicating in the representation that the modification comprises adding one or more new container objects at the position of the text object and that the value associated with the new container node is the text object.

In accordance with some embodiments, the objects comprise text objects defining editable text data and wherein the object comprise container objects defining a container for one or more objects, and the method further comprises: identifying the root node of the data structure; defining the root node as a container object; identifying all children nodes to the root node that are text objects; for each text object: if a text object is next to a container object in the data structure, add the editable text data defined by the text object as a value for the container object and delete the text object; and indicating in the representation that the modification comprises appending the children objects of the container object with the text data of the text object. Else, wrap the text node in a container object assigned to a new index.

In accordance with some embodiments, generating the corresponding modification to the data on the other user computers comprises indicating the modification on the display.

In another aspect, some embodiments of the invention provide a method for illustrating modified data displayed on one or more user computers comprising: storing a first version of data comprising a plurality of objects including textual objects and media objects; detecting a modification to the first version of the data, wherein the data with the modification is a second version of the data; receiving a request to publish the data; determining a first set of differences between the first version of the data with the second version of the data; and publishing a third version of the data illustrating the first set of differences.

In accordance with some embodiments, the method further comprises: detecting an author of the modification to the data; publishing the third version of the data indicating the author of the modification.

In accordance with some embodiments, the method further comprises: storing the third version of the data; detecting another modification to the data, wherein the data with the other modification is a fourth version of the data; receiving a request to publish the fourth version of the data; determining a second set of differences between the third version of the data with the fourth version of the data; and publishing a fifth version of the data illustrating the second set of differences.

In accordance with some embodiments, the method further comprises: publishing the fifth version of the publication illustrating the first set of differences and the second set of differences, wherein the first set of differences are illustrated differently than the second set of differences.

In accordance with some embodiments, the method further comprises: detecting a first author of the modification to the first version of the data; detecting a second author of the modification to the second version of the data; publishing a third version of the data illustrating the differences and the author of the modification. Wherein the first set of differences indicates the first author and the second set of differences indicates the second author.

In accordance with some embodiments, the method further comprises animating to illustrate the first set of differences.

In accordance with some embodiments, the method further comprises indicating a description of the first set of differences.

In another aspect, some embodiments of the invention provide a system for facilitating the synchronization of data on two or more user computers, the data being maintained in a data structure as objects, the system comprising: a modification module for: assigning an index to one or more objects maintained in the data structure, wherein each index provides an address for an object within the data structure; detecting at least one modification to the data, wherein said modification is initiated on a user computer; updating one or more objects in the data structure based on the modification; and creating a representation of the at least one modification, wherein the representation comprises a reference to one or more indexes assigned to the one or more updated objects; and an output module for transmitting the representation, wherein the representation is for use in generating a corresponding modification to the data on other user computers.

In accordance with some embodiments, the modification module is further for generating the corresponding modification to the data on the other user computers using the representation.

In accordance with some embodiments, the modification module is further determining at least one type of modification for the at least one modification; updating one or more objects in the data structure based on the at least one type of modification; and wherein the representation comprises a reference to the at least one type of modification.

In a further aspect, some embodiments of the invention provide a non-transitory computer-readable medium upon which a plurality of instructions are stored, the instructions for facilitating the synchronization of data on two or more user computers, the data being maintained in a data structure as objects, the instructions which when executed by a processor cause the processor to perform steps comprising: assigning an index to one or more objects maintained in the data structure, wherein each index provides an address for an object within the data structure; detecting at least one modification to the data, wherein said modification is initiated on a user computer; updating one or more objects in the data structure based on the modification; creating a representation of the at least one modification, wherein the representation comprises a reference to one or more indexes assigned to the one or more updated objects; and transmitting the representation, wherein the representation is for use in generating a corresponding modification to the data on other user computers.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
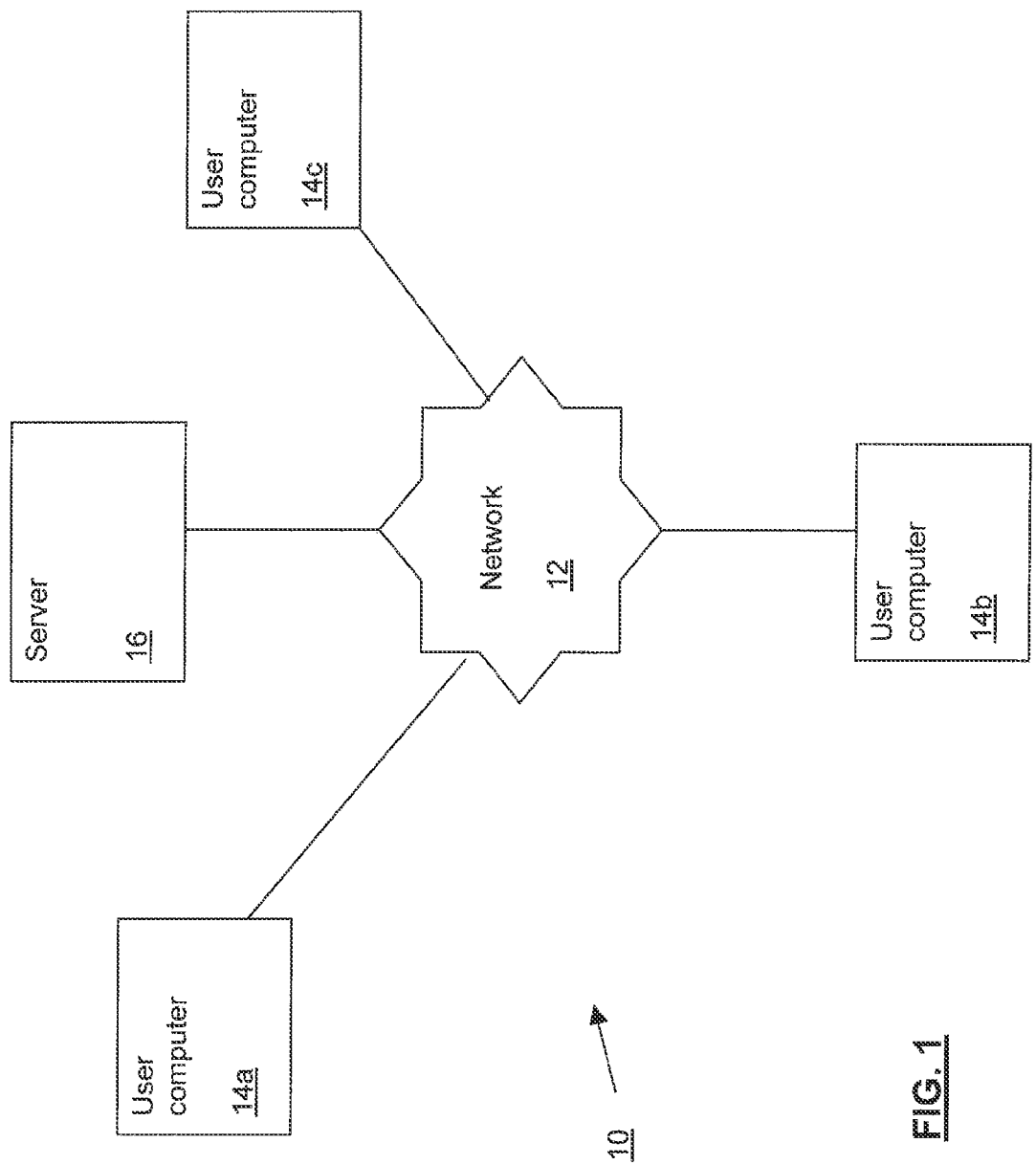
FIG. 1 is a block diagram of an example system for facilitating the synchronization of data on two or more user computers in accordance with at least one embodiment.

The drawings, described below, are provided for purposes of illustration, and not of limitation, of the aspects and features of various examples of embodiments described herein. The drawings are not intended to limit the scope of the applicants' teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. However, these embodiments may be implemented in computer programs executing on programmable computers, each computer including at least one processor, a data storage system (including volatile and non-volatile memory and/or storage elements), and at least one communication interface. For example, the programmable computers may be a server, network appliance, set-top box, interactive televisions, smart televisions, embedded device, computer expansion module, personal computer, laptop, personal data assistant, or mobile device. Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Reference is first made to FIG. 1, which illustrates a block diagram of a system 10 for facilitating the synchronization of data on two or more user computers 14a, 14b, 14c in accordance with at least one embodiment. System 10 is operable to display data, such as editable data for example, on user computers 14a, 14b, 14c connected via a network 12. Examples of data include text data, formatting data, image data, audio data, video data, embedded computing applications, raw data, data received from data feeds or a combination thereof, in an electronic format that is capable of being provided to or displayed on user computers 14a, 14b, 14c. In response to detecting a modification to the data, system 10 generates a corresponding modification to the data on the other user computers 14a, 14b, 14c in order to synchronize the data.

System 10 includes user computers 14a, 14b, 14c, which may be any networked computing device including a processor and memory, such as a personal computer, workstation, server, portable computer, mobile device, personal digital assistant, laptop, smart phone, WAP phone, an interactive television, a smart television, video display terminals, gaming consoles, an electronic reading device, and portable electronic devices or a combination of these. Although for clarity only three user computers 14a, 14b, 14c are illustrated in FIG. 1, there may be more user computers connected via network 12. The illustrated user computers 14a, 14b, 14c may be different types of devices. Further, one or more of the user computers 14a, 14b, 14c may be a server 16 although they are shown as different components in the illustrative example of FIG. 1. User computers 14a, 14b, 14c will be described in more detail herein in relation to FIG. 3.

In accordance with some embodiments, such as for example when the modification to the data changes more than a threshold amount of data, system 10 is operable to interact with a server 16 prior to generating the corresponding modification. Accordingly, system 10 may include a server 16 connected to the user computers 14a, 14b, 14c via network 12. Server 16 comprises one or more servers with computing processing abilities and memory such as database(s) or file system(s). For example, server 16 may include a mail server, web server, application server, database server, or a combination thereof. Although only one server 16 is shown for clarity, there may be multiple servers 16 or groups of servers 16 distributed over a wide geographic area and connected via e.g. network 12. Further, server 16 may be the same device as one or more of the user computers 14a, 14b, 14c although they are shown as different components in the illustrative example of FIG. 1. Server 16 will be described in more detail herein in relation to FIG. 4.

Network 12 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although not shown, user computers 14a, 14b, 14c and server 16 may connect to network 12 via a security device, such as for example a firewall, which is a device, set of devices or software that inspects network traffic passing through it, and denies or permits passage based on a set of rules and other criteria. Firewall may be adapted to permit, deny, encrypt, decrypt, or proxy all computer traffic between network 12 and user computers 14a, 14b, 14c and server 16 based upon a set of rules and other criteria. For example, firewall may be a network layer firewall, an application layer firewall, a proxy server, or a firewall with network address translation functionality.

Figure 2:
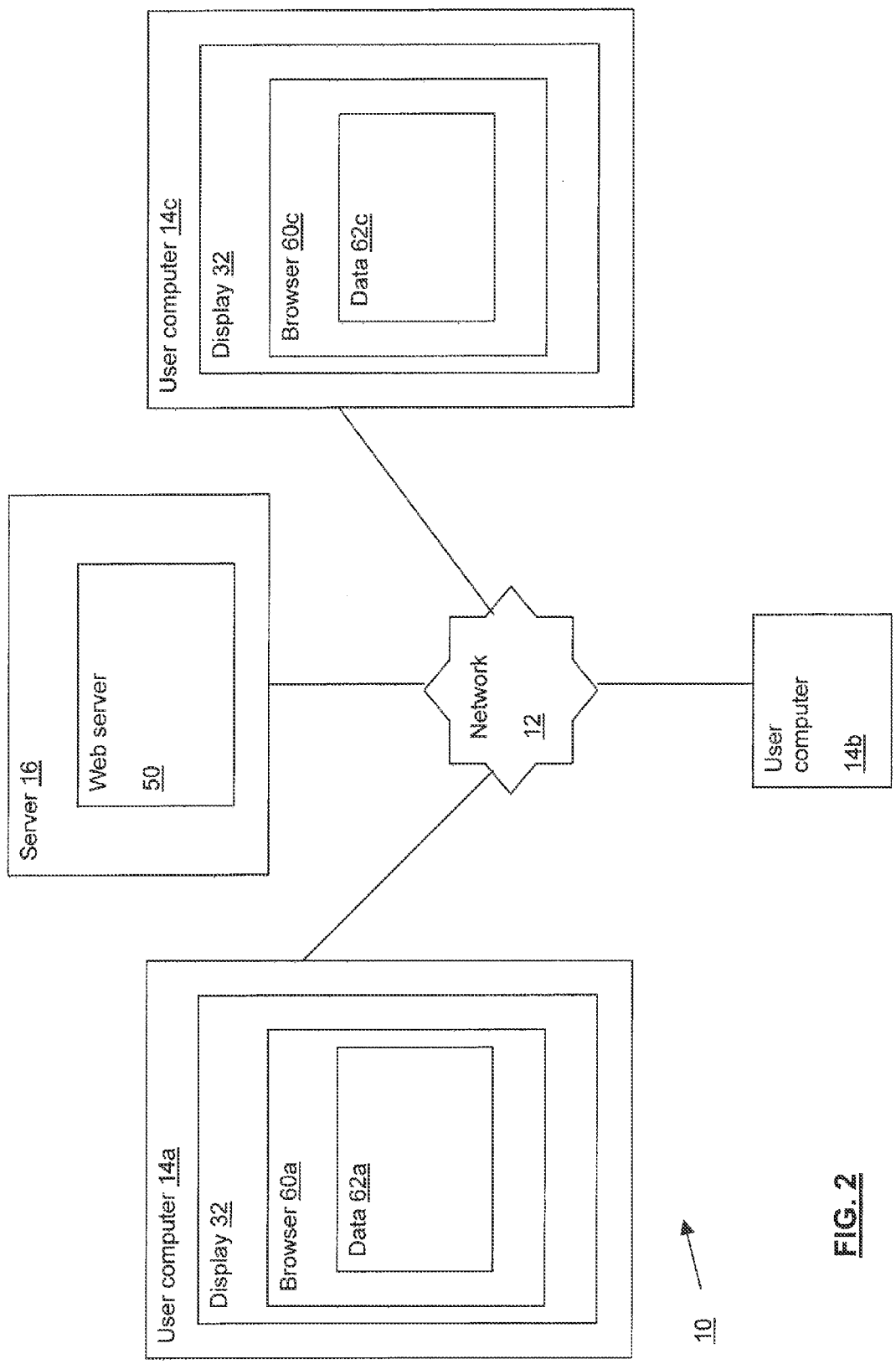
FIG. 2 is a block diagram of another example system for facilitating the synchronization of data on two or more user computers in accordance with at least one embodiment.

Reference is now made to FIG. 2, which illustrates a block diagram of an example system 10 for facilitating the synchronization of data displayed in a browser on two or more user computers in accordance with at least one embodiment. As an illustrative example, system 10 includes a user computer 14a, 14b, 14c with a display 32 displaying a web browser 60a, 60c and the data 62a, 62c. The data 62a, 62c may be served by web server 50 or another server that is capable of providing data to the user computer 14a, 14b, 14c. As another example, the data may reside in memory of the user computer 14a, 14b, 14c. When system 10 detects a modification to the data 62a, 62c initiated at one of the user computer 14a, 14b, 14c then system 10 synchronizes the data by generating a corresponding modification on the other user computers 14a, 14b, 14c. In this example, the data may be the content for an electronic news article and remote reporters may use system 10 to collaborate in order to create and modify the electronic news article. In this example, the reporters can access system 10 via a web browser 60a, 60c or via another computing application. When the user computers 14a, 14b, 14c display or modify the data then it may be a "live" version of the article, synchronized on some or all of the user computers 14a, 14b, 14c. System 10 may configure the user computers 14a, 14b, 14c to have read only, write only, or read and write permissions.

Figure 3:
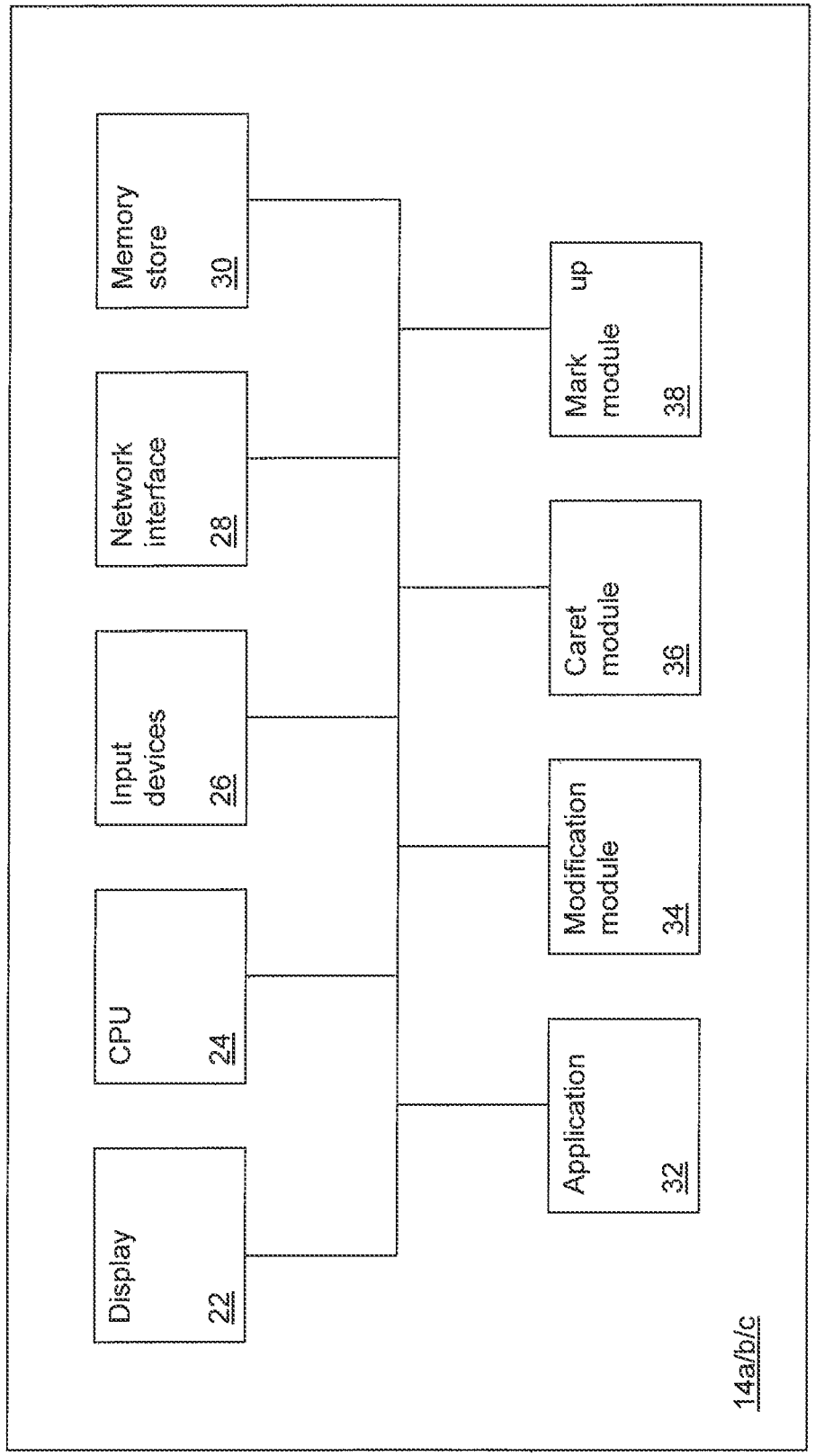
FIG. 3 is a block diagram of an example user computer for facilitating the synchronization of data in accordance with at least one embodiment.

Reference is now made to FIG. 3, which illustrates a block diagram of user computers 14a, 14b, 14c for facilitating the synchronization of data in further detail. In an exemplary embodiment, user computers 14a, 14b, 14c have associated with them a display 22, a central processing unit 24, input devices 26, a network interface 28, a memory store 30, and a computing application 32. The display 22 may be a monitor or display screen that is used to electronically display data. The input devices 26 may be any device that allows for input, examples of which may include, but are not limited to, keyboards, microphones, speakers, and pointing devices. The memory store 30 includes any type of computer memory that is located either internally or externally to the user computers 14a, 14b, 14c such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. The central processing unit 24 is used to execute instructions for operation of the user computers 14a, 14b, 14c and may include any type of processor, such as, for example, any type of general-purpose microprocessor or microcontroller, a digital signal processing (DSP) processor, an application-specific integrated circuit (ASIC), FPGA, a programmable read-only memory (PROM), or any combination thereof. The network interface 28 may be a wired and/or wireless network interface that allows the device to connect to the network 12. User computers 14a, 14b, 14c may also include peripheral devices, such as printers, antenna, transceivers, speakers and scanners. User computers 14a, 14b, 14c may include an application 32 which may be a software application, application plug-in (e.g. a widget), instant messaging application, mobile device application, e-mail application, online telephony application, java application, web page, or web object residing or rendered on the respective user computers 14a, 14b, 14c in order to access the functionality of system 10. The user computers 14a, 14b, 14c, may be different computing devices and may include a server. Further, one or more of the user computers 14a, 14b, 14c may be a server 16 and may include the components illustrated in FIG. 4.

User computers 14a, 14b, 14c may also include a modification module 34, caret module 36, and a markup module 38. The modification module 34 is operable to detect modifications to the data initiated on the respective user computer 14a, 14b, 14c. The modification module 34 is further operable to determine the type of modification and create a representation of the modification for transmission to the other user computer 14a, 14b, 14c. A modification module 34 at those user computers 14a, 14b, 14c will generate a corresponding modification to the data residing or rendered thereon.

The caret module 36 is operable to display a caret on each user computer displaying editable data, wherein the caret is operable to move to different positions within the editable data. In accordance with some embodiments, for each of the user computers 14a, 14b, 14c displaying editable data, the caret module 36 is operable to store the position of the caret before generating the corresponding modification to the data. The caret module 36 is operable to display the caret at the stored location after generating the corresponding modification to the data. For example, the caret module 36 may only store the caret location and re-display the caret at the stored location when the editable data is changed by more than a threshold amount of data. The caret module 36 may store the position of the caret as a tag or place marker within the data structure maintaining the data. The place marker may include a label for indicating that it is the place marker for the caret. When the caret module 36 receives the modified data structure from the server 16 the caret module 36 is operable to process the data structure to identify the place marker and insert the caret at the position of the place marker. The place marker may only temporarily be included in the data structure and may be removed from the data structure once the caret has be re-positioned at the stored position. The caret module 36 is operable to redisplay the caret on the user computer 14a, 14b, 14c that initiated the modification or on some or all user computers 14a, 14b, 14c where a corresponding modification is generated.

The markup module 38 is operable to illustrate modified data by illustrating the differences (including formatting differences) between two different versions of the data. For example, the markup module 38 is operable to store versions of data, such as an electronic publication, to determine a set of differences, and is further operable to publish a version of the data illustrating the set of differences. The markup module 38 may illustrate the differences by marking up or highlighting one of the compared versions, or listing a description of the set of differences in a side pane, for example.

Figure 4:
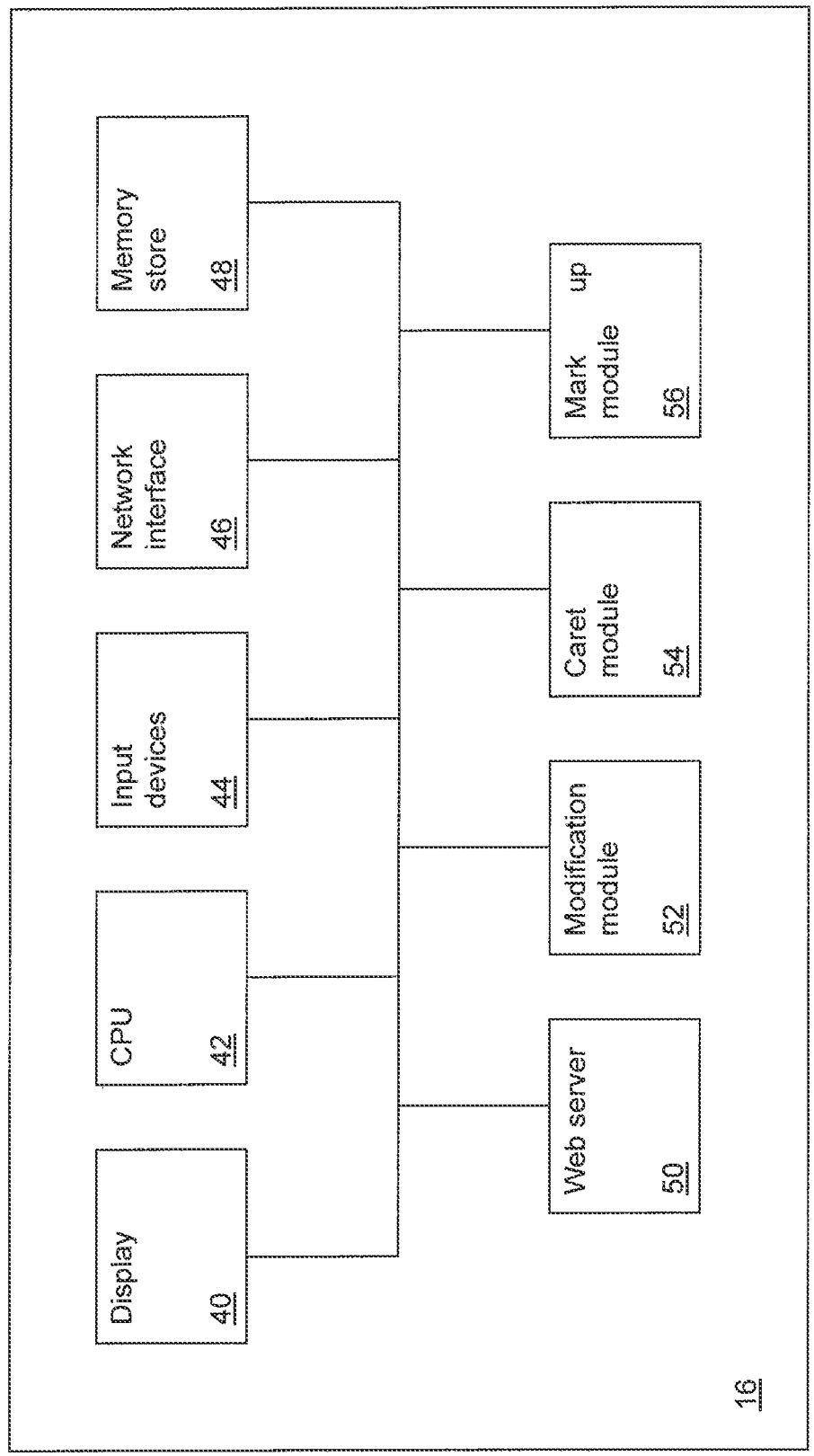
FIG. 4 is a block diagram of an example server for facilitating the synchronization of data in accordance with at least one embodiment.

Reference is now made to FIG. 4, which illustrates a block diagram of a server 16 for facilitating the synchronization of data in accordance with at least one embodiment. In an exemplary embodiment, server 16 has associated with it a display 40, a central processing unit 42, input devices 44, a network interface 46, a memory store 48, a web server 50, a modification module 52, caret module 54, and a markup module 56. The display 40 may be a monitor or display screen that is used to electronically display data. The input devices 44 may be any device that allows for input, examples of which may include, but are not limited to, keyboards, microphones, speakers, and pointing devices. The memory store 48 include any type of computer memory that is located either internally or externally to the server 16 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. The central processing unit 42 is used to execute instructions for operation of the server 16 and may include any type of processor, such as, for example, any type of general-purpose microprocessor or microcontroller, a digital signal processing (DSP) processor, an application-specific integrated circuit (ASIC), FPGA, a programmable read-only memory (PROM), or any combination thereof. The network interface 46 may be a wired and/or wireless network interface that allows the server 16 to connect to the network 12. Server 16 has a network interface 46 for connecting to network 12 in order to communicate with other components, to serve web pages, and perform other computing applications. Server 16 may connect to one or more user computers 14a, 14b, 14c via network 12. Although only user computers 14a, 14b, 14c have been illustrated, any suitable number of user computers may connect to the server 16. Web server 50 may be a web server or an application server (where the application is accessed via network 12) provide a service to user computers 14a, 14b, 14c, such as providing access to a computing application for editing data, aggregating data and receiving and responding to requests received from user computers 14a, 14b, 14c. Further, server 16 may be the same device as one or more of the user computers 14a, 14b, 14c and may include the components illustrated in FIG. 3.

Server 16 may also include a modification module 52, caret module 54, and a markup module 56. The modification module 52 is operable to interact with modification modules on the user computers 14a, 14b, 14c. The modification module 34 is further operable to determine the type of modification and create a representation of the modification for transmission to other user computers 14a, 14b, 14c. A modification module 34 at other user computers 14a, 14b, 14c will generate a corresponding modification to the data residing or rendered thereon. When a modification changes the data by more than a threshold amount, the modification module 52 is further operable to generate a modified version of the data structure maintaining the data for the representation.

The caret module 54 is operable to receive the position of the caret from the caret module 36 on some or all of the user computers 14a, 14b, 14c displaying editable data with write permissions in order to edit the data. For example, the caret module 36 may store the position of the caret as a tag or place marker within the data structure maintaining the data. The place marker may include a label for indicating that it is the place marker for the caret. The caret module 54 is operable to receive the position of the caret upon receipt of the data structure containing the place marker.

The markup module 56 is operable to generate an illustration of the differences between two or more different versions of the modified publication. The markup module 56 stores versions of an electronic publication to determine a set of differences, and generates a version of the publication illustrating the set of differences. For example, the markup module 56 may illustrate the differences by marking up or highlighting one of the compared versions, or listing the set of differences in a side pane, for example.

Figure 5:
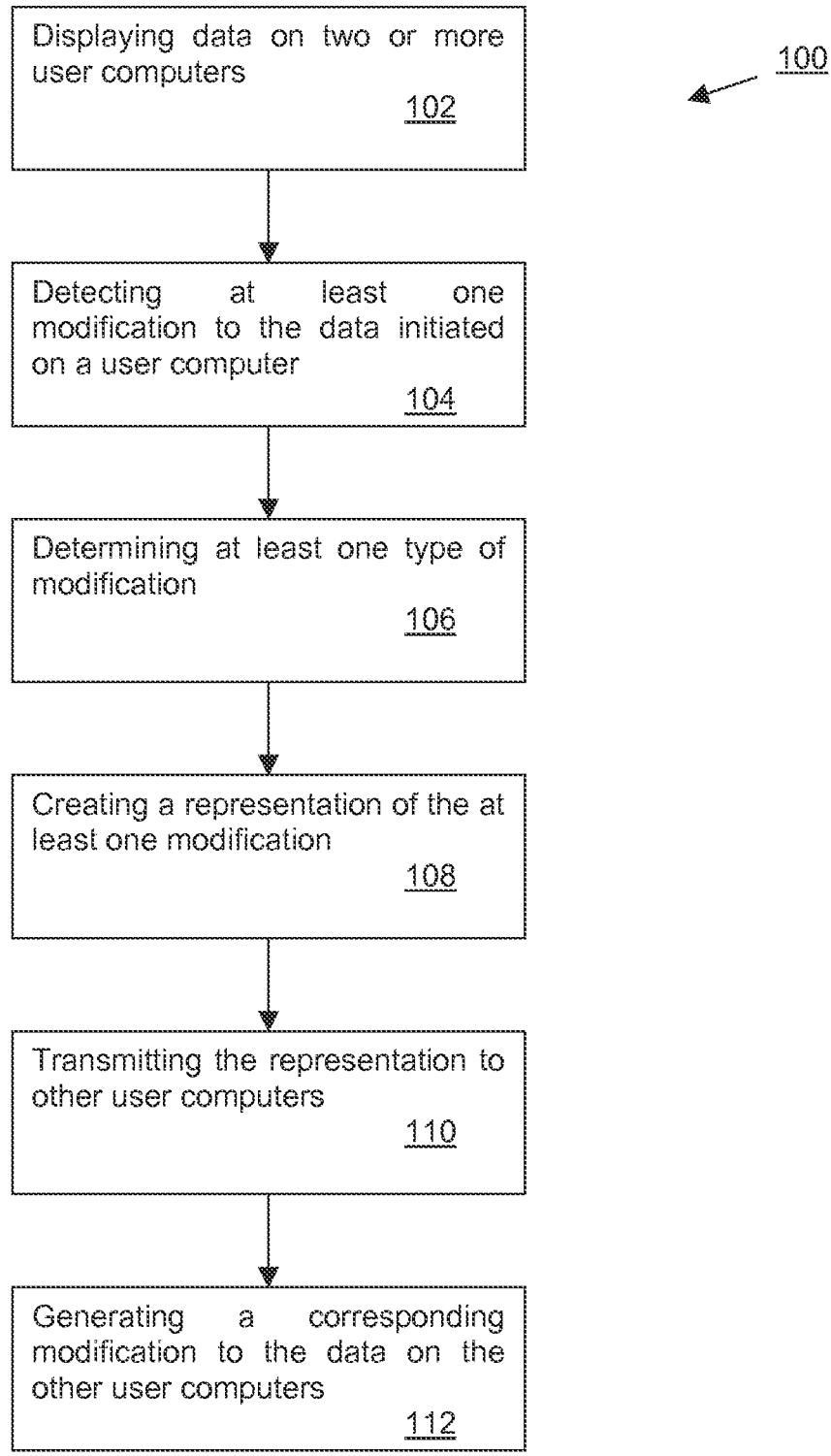
FIG. 5 is a flowchart diagram of an example method for facilitating the synchronization of data on two or more user computers in accordance with at least one embodiment.

Reference is now made to FIG. 5, which illustrates a flowchart diagram of a method 100 for facilitating the synchronization of data on two or more user computers in accordance with at least one embodiment. System 10 may implement method 100 using only user computers 14a, 14b, 14c in a peer-to-peer configuration, or by involving server 16, or by using a user computer 14a, 14b, 14c 14a as a server.

At step 102, system 10 is operable to optionally display data on the user computers 14a, 14b, 14c. The data may be text data, formatting data, image data, audio data, video data, embedded computing applications, data feeds or a combination thereof, in an electronic format that is capable of being provided to or displayed on user computers 14a, 14b, 14c. For example, the data may be displayed in a browser 60a, 60b on user computers 14a, 14b as part of an electronic document or page, including for example document editing application documents, markup language documents such as HTML, XML, XHTML, and the like. The data may be editable data or otherwise capable of modification such as for example by adding data thereto. As an example in the context of HTML, system 10 is operable to configure the data to be editable data using attributes of the HTML specification including designMode or contentEditable. The designMode attribute governs an entire document or page and may be used by system 10 to make an entire document or page editable. The contentEditable attribute governs an element or object (both will be referred to herein as objects) that appears in a document or page, and that object's children to provide text editor control for the object within the document or page. Accordingly, both designMode and contentEditable may be called by system 10 to display editable data on user computers 14a, 14b, 14c. In some embodiments, system 10 may display editable data on one or more user computers 14a, 14b, 14c with write permissions but display data that is not editable on other user computers 14a, 14b, 14c with read only permissions. As another example, system 10 may store the data as an array and display the data using a document editing application.

In some embodiments, before displaying the data, system 10 is operable to verify that it is displaying the most up to date version of the data. System 10 may send a call out or request to all one or more user computers 14a, 14b, 14c connected to system 10 for representations of modifications, a most up to date or recent copy of the data, or a combination thereof. System 10 generates the corresponding modifications before displaying the data to provide an up to date, live version of the data.

In accordance with at least some embodiments, system 10 is operable to publish and display data through the publishing platform ScribbleLive™ (http://www.scribblelive.com/). System 10 is further operable to publish and display data through the use of dynamic templates.

In order to publish data (modifications thereto), system 10 may publish a current version of the data to server 16 (or another server not shown) for retrieval by user computers 14a, 14b, 14c for display thereon. The server 16 may also publish computer-readable instructions, such as JavaScript code, for causing the user computers 14a, 14b, 14c to periodically poll for an up to date or modified version of the data before it displays the data to ensure it is a recent version of the data.

At step 104, system 10 detects at least one modification to the data initiated on a user computer 14a, 14b, 14c. Examples of modifications includes, adding data such as text or an image, deleting data, changing the formatting of data, changing the value of data, dragging in data from a live blog or dynamic content publishing system, and so on. System 10 is operable to detect the modification at the user computer 14a, 14b, 14c at which the modification was initiated or at the server 16. The server 16 may also be the user computer 14a, 14b, 14c at which the modification was initiated if the modification to the data was received at the server 16. System 10 is operable to detect a modification to the data without displaying the data such as for example, upon receiving a request to directly add data or detecting an update to data feeds to populate the data. Examples of data feeds are for the score in a sporting event, current temperature, contest results, polling data, and the like. System 10 is operable to receive input from user computer 14a, 14b, 14c via input devices 26 or receive an update via data feeds at the server 16, and system 10 is operable to detect that a modification has occurred. The modification may be initiated on the user computer 14a, 14b, 14c that received the input or data feed update, or the server 16 that received the input or data feed update. System 10 may detect that a modification has occurred after a predetermined time duration (e.g. 500 ms) has expired since the last received input. System 10 is operable to periodically check the data after a predetermined time duration has expired to detect modifications. System 10 is operable to store a previous version of the data and compare the previous version to new versions to detect modifications. For example, system 10 will detect a modification to the data if the size, length, height, or other attributes of the new version of the data is different than the previous version of the data.

The data may be maintained in a data structure as objects. An object is a computer representation of data that is associated with attributes and the like. System 10 assigns an index to one or more of the objects, where the index provides an address for the object within the data structure. System 10 updates the data structure to maintain the modification as well. The modification may also be represented in the data structure as objects, and an index may also be assigned to the objects representing the modification. For example, the data may be displayed in a browser 60a, 60b on user computers 14a, 14b as part of a document or page and the data structure may organize data on the document or page to provide structure for the data, to define relationships between data components, and so on.

In accordance with some embodiments, the objects are organized in the data structure as a connected tree of nodes, each node in the tree corresponding to an object; wherein each node in the connected tree has zero or more parent nodes, zero or more sibling nodes, and zero or more children nodes; and wherein the connected tree comprises a root node having zero parent nodes. The objects may also be organized in other types of data structures, such as an array, a vector, a graph, a list and so on.

In accordance with some embodiments, system 10 uses the Document Object Model (DOM) to define a data structure as a connected tree of nodes. The DOM is a model that describes how all objects (or elements) in an page, like input fields, images, paragraphs, and so on, are related to the topmost structure: the document itself. The DOM provides an application-programming interface (API) for accessing, interacting with, and modifying the objects in the document. For example, system 10 is operable to use the DOM API to configure the objects and retrieve/set attributes regarding the objects.

As an illustrative example, the data may form part of an online news article, and system 10 is operable to enable a plurality of reporters and authors to work on the news article collaboratively and in sync via user computers 14a, 14b, 14c, where the data is accessible via the Internet and the data structure is defined by the DOM.

For this illustrative example, in order for system 10 to access the data in source XML documents, the source XML files are converted into an XML document object in memory by an XML parser, which results provide a set objects (a document object) defined by the DOM. The DOM provides a model of how the various objects in the set of objects are related to each other. This set of objects can be represented as a tree of nodes that contain the data and structure of the information contained in the XML document. System 10 can access, interact with, and modify the tree of nodes using the DOM API. Each object, whatever type it may be, may be represented as a node.

As a simplified example, the data may be text data such as "This is bold text!".

For this example, the data may be represented in a data structure as:

```
<span class="SL_C_1933737_14074">This is bold text!</span>
or
<span id="SL_C_1933737_14074">This is bold text!</span>
or
<span class=
"SL_C_1933737_14074 Edit Creator1933737">This is bold text!
</span>
or
<span id="SL_C_1933737_14074" class=
"Edit Creator1933737">This is bold
text!</span>
```

System 10 is operable to associate a user identifier with each modification to track which user computer 14a, 14b, 14c initiated the modification. The user identifier may be a hash or string of characters used to identify a user computer 14a, 14b, 14c or a user thereof. For example, system 10 may require that a user of a user computer 14a, 14b, 14c logs in to system 10 using a user identifier in order to access the data. If a modification is initiated at a user computer 14a, 14b, 14c associated with the user then system 10 is operable to associate data that indicates the user identifier with those modifications. System 10 may include the user identifier in the representation. For the above illustrative example, a user identifier is represented as "Edit Creator1933737" which indicates the user who initiated the creation of the text data "This is bold text!". This illustrative example shows that system 10 includes the user identifier in the representation as part of the class name, however, system 10 is operable to include the user identifier in other places within the representation. System 10 is further operable to store a user identifier in association with modifications to maintain a record of user that initiated modifications. Further, system 10 is operable to include other attributes in the representation as part of a class name or in another part of the representation. System 10 is operable to associate a user identifier with modifications to consider specific styles or other formatting data that apply to a user, to determine whether the user has the required data permissions to make the modification(s), to subsequently determine which user made the modification, and so on.

Figure 6:
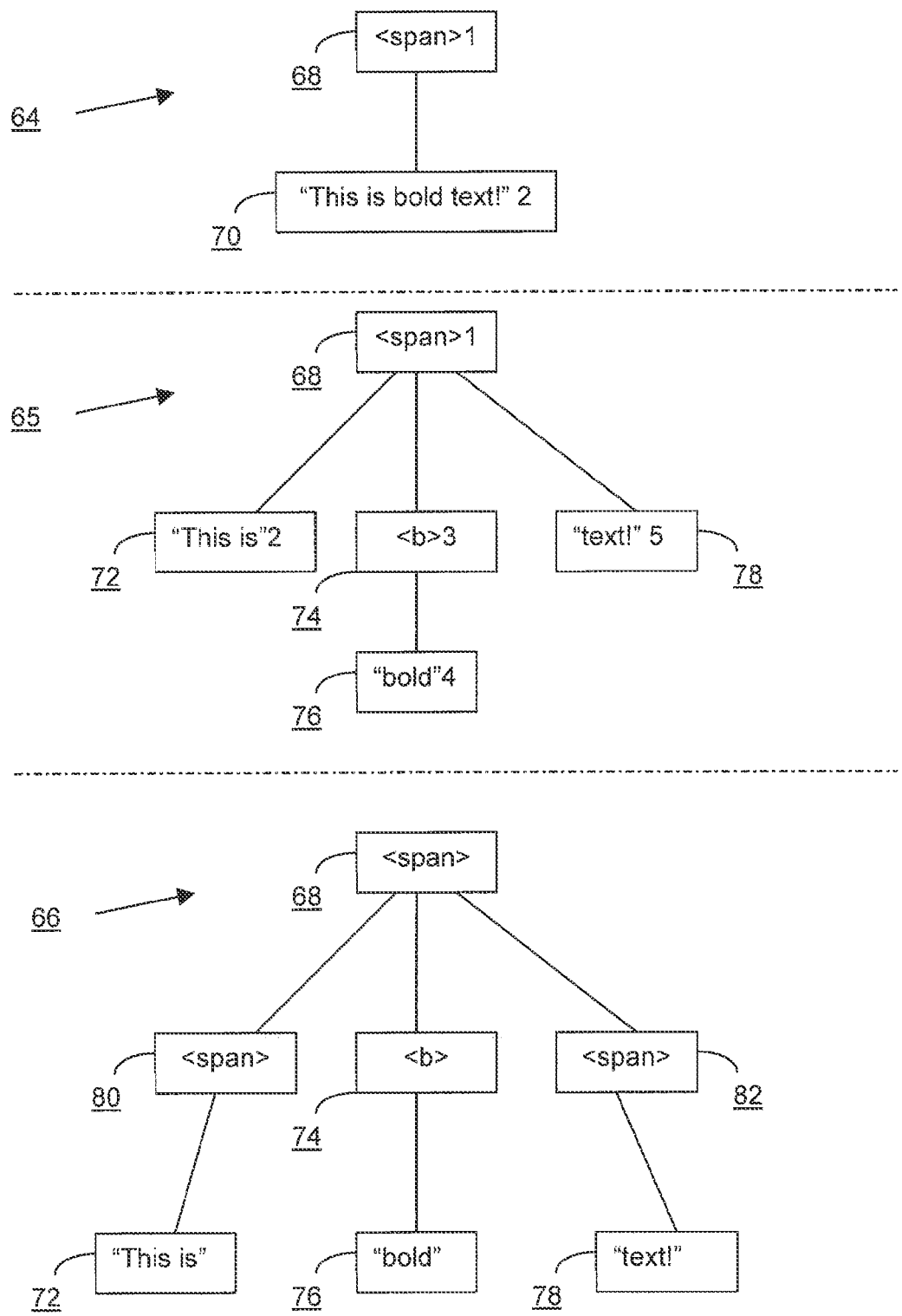
FIG. 6 is a diagram of data structures organized as connected trees of nodes in accordance with at least one embodiment.

Reference is now made to FIG. 6, which illustrates a diagram of data structures organized as connected trees of nodes in accordance with at least one embodiment. The data structure may also organize the objects as an array, vector, graph and so on.

As an example, the text data "This is bold text!" is represented as a tree 64 of nodes 68, 70. The tree 64 contains a span node 68 representing a span object that is a container object. A container object can hold a text object or another container object. The tree contains a text node 70 representing a text object (or text element) with the text data "This is bold text!". The text data may also be referred to as the object's value or content. The text node 70 is considered the child node of the span node 68 and the span node 68 is the parent node of the text node 70, because the text object is inside the span object. The span node 68 is also the root node for the tree, because the span node 68 has zero parent nodes. FIG. 6 illustrates tree 64 as an example only and system 10 is operable to organize the data in alternative tree configurations and other configurations. For example, the span node 68 may have the text data as its value instead of having the separate text node 70 as its child.

As a simplified example, a modification may be bolding text data within the text object, and in particular, bolding the text "bold" in the data "This is bold text!". Referring back to FIG. 6, which illustrates a diagram of a data structure organized as a connected tree 65 of nodes 68, 72, 74, 76, 78 for the data "This is bold text!". The modification of bolding text data results in the data structure being modified and represented as a new tree 65. The span node 68 represents a span object and is the root node in the tree 65. The text node 72 represents a text object with text data "This is". The bold node 74 represents bolding data of one or more objects, and in particular those objects represented as children nodes to the bold node 74. A child node to the bold node 74 is the text node 76, which represents the text object with the text data "bold". The text node 78 represents a text object with text data "text!". Text nodes 72, 76 may not be required for text data and instead system 10 is operable to include text data as the value for its parent object, such as the span node 68 and the bold node 74.

As noted herein, the data may be maintained in a data structure as objects, and the system 10 is operable to assign an index to one or more objects in the data structure. An index for an object provides an address in the data structure for the object so that system 10 can look up the object. An index for an object may be an identifier associated with the object or may indirectly reference the object by its parent. The index may be one or more attributes that system 10 uses to identify the object. For example, the index may comprise a unique token used to directly identify the object, such as a series of reference characters. For example, the index may be a hash value for the object.

As another example, the data structure may maintain each object in a position relative to other objects, and the index may be a positional value for the object. For example, the index may comprise a coordinate storing the position of its assigned object in relation to the other objects. In some embodiments, the index may include a coordinate that is defined by at least three other nodes in a tree. For example, the three other nodes may be a previous sibling node in the tree, a next sibling node in the tree, and a parent node in the tree. The positional value may contain a reference to at least three other nodes in the event of those three nodes are also changed by the modifications. For example, an object may be represented as a parent node, another object may be represented as a child node to the parent node, and another object may be represented as another child node to the parent node. The positional value may reference both the parent and sibling nodes. Modifications may first move the sibling nodes being to another position and then delete the parent node. The system 10 may implement these modifications in sequence and using a positional value that references more than one other node in the tree provides multiple mechanisms to identify an object in the event a parent or a sibling is modified as well to ensure the parent or siblings is properly referenced.

An index for an object may reference the position of a parent node to the object. If the system 10 determines that the object is changed by the modification then the system 10 could include the entire changed contents of the parent node in the representation.

In some embodiments, the data structure may organize the objects as an array and the indexes may be positional values in the array of objects. The index may include a token, a positional value or both the token and the positional value (such as the coordinate for example).

The index may include different kinds of values depending on the object, such as a token for one object and a positional value for another object. The index for an object may include multiple values, such as both a token and a positional value for one object. For the example illustrated in FIG. 6, the indexes may include both a token and a positional value such as its coordinates in a tree. The token is a character or series of characters used to identify the object. The positional value may be defined as in relation to other nodes in the tree, and in this example is defined as (ls, rs, p) or the left sibling, the right sibling and the parent node.

Using tree 64 as an example, for the span node 68 the token may be 1 and for the text node 70 the token may be 2. The coordinates for the span node 68 may be (null, null, null) because it is the root node and has no parent node or sibling nodes. The coordinates for the text node 70 may be (null, null, 1) because it has no sibling nodes and the parent node (span node 68) token is 1. As another example, in the context of HTML, text nodes may not have an identifier or class name to use as a token for the text object. In such case, a container node that stores the text data can be used as an index, and the token assigned to the parent container node is used to address the text data in the data structure.

Using tree 65 as another example, for the span node 68 the token may be 1, for the text node 72 the token may be 2, for the bold node 74 the token may be 3, for the text node 76 the token may be 4, and for the text node 78 the token may be 5. The tokens assigned to the text nodes may vary depending on the implementation. For example, if the data is displayed in a web browser then the tokens assigned to the text nodes will vary depending on the kind of web browser used. The coordinates for the span node 68 may be (null, null, null) because it is the root node and has no parent node or sibling nodes. The text node 72 coordinates may be (null, 3, 1), the bold node coordinates 74 may be (2, 5, 1), the text node 76 coordinates may be (null, null, 3), and text node 78 coordinates may be (3, null, 1).

In some embodiments, system 10 is operable to locate text objects with siblings that are container objects that are not wrapped with a container object. System 10 is further operable to modify the data to wrap the located text objects with container objects. Referring back to FIG. 6, tree 66 represents modified data where system 10 modifies the data represented by tree 65 to wrap the text objects in span objects, which are container objects. System 10 identifies text node 72 and text node 78 as text objects that have a container object as a sibling (bold node 74) and wraps text nodes 72, 78 in span objects 80, 82. That is, system 10 places text nodes 72, 78 in span objects 80, 82. System 10 can implement these steps client side at the user computers 14a, 14b, 14c or server 16 side. System 10 is operable to wrap text objects with container objects because for some implementations, such as in HTML, text objects may not contain identifiers that may be used as a token. The index for such a text object may still be a positional value, but it may be more efficient to use a token address depending on the type of modification, so both options are available for text objects that are wrapped in a container object.

At step 106, in accordance with at least some embodiments, system 10 is operable to determine at least one type of modification for the at least one modification. Example types include: deleting an object from the data, adding an object to the data, editing an object of the data, moving an object from a first position to a second position, and changing the data by more than a threshold amount of data. Another example includes changing the attributes of an object, such as for example an index that is a coordinate defined by the siblings and parent nodes of an object. This may occur if a new sibling is added.

For this example of bolding text, system 10 is operable to determine that different types of modifications occur. System 10 is operable to detect that one type of modification is that new objects have been added to the data structure, including objects represented by bold node 74, text node 76, and text node 78. In addition, system 10 is operable to detect that one type of modification is editing data of an object, including the text object represented by text node 72. The data for the text object 70/72 has been changed from "This is bold text!" to "This is" in the data structure representation.

Upon detecting that a modification occurred to the data, system 10 is operable to update objects in the data structure to reflect the modification. For example, if the modification includes bolding text data that results in adding new objects and modifying existing objects, then system 10 is operable to update the data structure by adding new objects and modifying the existing objects.

At step 108, system 10 creates a representation of the at least one modification. The representation comprises a reference to one or more indexes assigned to the one or more updated objects. The representation may also include a reference to the at least one type of modification. Further details relating to determining the type of modification and how to create the representation will be described in herein, such as in relation to FIGS. 9 and 10.

The representation may be any format that instructs the other user computers 14a, 14b, 14c how to generate a corresponding modification. The representation may be relatively small in size compared to the entire data so that transmitting only the representation of the modification will be more efficient than transmitting all data each time a modification is detected. The representation may include a reference to the type of modification, a reference or indications of what objects are modified, how the objects are modified, or a combination thereof. The representation is in any format that can be processed and parsed by the user computers 14a, 14b, 14c. For example, the format of the representation may be JSON (JavaScript Object Notation), which is a lightweight data-interchange format. System 10 is operable to generate different formats for the same representation, or translate the representation into different formats to be compatible with the various user computers 14a, 14b, 14c. For example, one user computers 14a, 14b, 14c may require a representation in a different format, such as XML, then another user computers 14a, 14b, 14c which may require a representation in JSON. System 10 is operable to translate a representation in one format into another format.

For the simplified example, system 10 generates a representation that indicates that new span objects have been added, a new bold object has been added, a text element has been edited, and text elements have been moved inside span objects and a bold object.

As noted above, the data for "This is bold text!" may be represented in a data structure as:

```
<span class="SL_C_1933737_14074 Edit Creator1933737">This is bold text!</span>
```

The modified data "This is bold text!", where the text objects have been wrapped in container objects, may be represented in a data structure as:

```
<span class="SL_C_1933737_14074 Edit Creator1933737"><span
class="SL_C_1933737_14075 Edit Creator1933737">This is </span><b
class="SL_C_1933737_14077 Edit Creator1933737">bold</b><span
class="SL_C_1933737_14076 Edit Creator1933737">text!
</span></span>
```

As an example, a log of the actions implemented by system 10 at the user computer that initiated the modification may be:

```
RegisterNewCompartments:
creating SL_C_1933737_14077 with contents <b
class="SL_C_1933737_14077 Edit Creator1933737">bold</b>
PutTextNodesIntoCompartments: putting text! into a compartment
SL_C_1933737_14076
PutTextNodesIntoCompartments: putting This is into a compartment
SL_C_1933737_14075
```

As an example, the representation of the modification in JSON format may be:

```
{ "Action":"insert", "NewElementIndex":"SL_C_1933737_14075",
"NewElementHtml":"<span class=\"SL_C_1933737_14075 Edit
Creator1933737\">This is </span>",
"Location":"null,SL_C_1933737_14077,SL_C_1933737_14074}
{ "Action":"insert", "NewElementIndex":"SL_C_1933737_14076",
"NewElementHtml":"<span class=\"SL_C_1933737_14076 Edit
Creator1933737\"> text!</span>",
"Location":"SL_C_1933737_14077,null,SL_C_1933737_14074}
{ "Action":"insert", "NewElementIndex":"SL_C_1933737_14077",
"NewElementHtml":"<b class=\"SL_C_1933737_14077 Edit
Creator1933737\">bold</b>",
"Location":"SL_C_1933737_14075,SL_C_1933737_14076,
SL_C_1933737_14074
}
```

As another general example, the representation may be:

```
insert new object <span class=\"SL_C_1933737_14075 \">This is
</span>" at location (null,SL_C_1933737_14077,
SL_C_1933737_14074)
insert new object <span class=\"SL_C_1933737_14076\"> text!
</span>" at location (SL_C_1933737_14077,null,
SL_C_1933737_14074)
insert new object <b class=\"SL_C_1933737_14077\">bold
</b>" at location
(SL_C_1933737_14075,SL_C_1933737_14076,
SL_C_1933737_14074)
```

As an example, a log of the actions implemented by system 10 at the other user computers to generate a corresponding modification using the representation may be:

```
Insert: inserting SL_C_1933737_14077
based on previous SL_C_1933737_14075
Insert: inserting SL_C_1933737_14076
based on parent SL_C_1933737_14074
Insert: inserting SL_C_1933737_14075
based on parent SL_C_1933737_14074
```

The representation may not list out each individual modification and may instead provide a portion of data to add to the data structures maintaining the data on the other user computers, or to use as replacement data. For example, if system 10 determines that the modification changed multiple objects that are all children to the same parent object, the system 10 may include a copy of the parent object and all children in the representation, along with the index assigned to the parent object. The representation will instruct the other computers to replace the previous parent object with the new copy of the parent object in the representation.

At step 110, system 10 transmits the representation. System 10 is operable to transmit the representation to other user computers 14a, 14b, 14c that are connected to system 10 and listening for modifications to the data. System 10 may transmit the representation to all other user computers 14a, 14b, 14c except for the user computer at which the modification was detected, or may transmit to a portion thereof. System 10 may also transmit the representation to server 16 which may in turn transmit the representation to other user computers 14a, 14b, 14c that are connected to system 10 and listening for modifications to the data. Server 16 may store some or all received representations in order to maintain a central repository of all modifications or versions of the data System 10 may also transmit representations to other user computers 14a, 14b, 14c in response to a request for updates. For example, before displaying the data, system 10 may issue a call to other user computers 14a, 14b, 14c for an updated version. Alternatively, the other user computers 14a, 14b, 14c may automatically send their latest version of the data to system 10 so that system 10 maintains the most recent copy of the data. If another user computer wants to join the session to collaborate on the data then the system 10 may provide the user computer with the most recent copy of the data.

At step 112, system 10 generates a corresponding modification to the data on the other user computers 14a, 14b, 14c using the representation. For example, system 10 is operable to update the display of data on the other user computers 14a, 14b, 14c to synchronize the display of data on the user computer on which the modification was detected. At the other user computers 14a, 14b, 14c, system is operable to parse and process the representation in order to generate a corresponding modification.

System 10 is operable to generate a corresponding modification by indicating the modification on the display of the user computers 14a, 14b, 14c, by marking up the previous version of the data, highlighting the modification, animating the modification, providing a description of the modification, or otherwise indicating the modification.

In accordance with at least some embodiments, system 10 is operable to publish and display data through the publishing platform ScribbleLive™ (http://www.scribblelive.com/). System 10 is further operable to publish and display data through the use of dynamic templating.

In order to publish data and modifications thereto, in accordance with at least some embodiments, at step 102, a current version of the data may be published to server 16 (or another server not shown) for retrieval by user computers 14a, 14b, 14c for display thereon. The server 16 may also publish computer-readable instructions, such as JavaScript code, for causing the user computers 14a, 14b, 14c to periodically poll for updates to the data (e.g., in the form of representations of modifications to the data or another indication that modifications have been made).

Subsequently, the system 10 may periodically determine whether modifications to the data have been made during a predetermined interval and whether representations of the modifications have been transmitted at step 110. If modifications have been made, the system 10 is operable to transmit the representation to a server (server 16 or another server not shown), for retrieval by the user computers 14a, 14b, 14c. The system 10 may also transmit an indication that modifications have been made (e.g., a timestamp).

Accordingly, the user computers 14a, 14b, 14c, while periodically polling for modifications to the data, can determine that modifications have been made and retrieve the representation of the modifications. Based on the representation, at step 112 system 10 can modify each user computer's 14a, 14b, 14c version of the content, resulting in a modified version of the content at the user computers 14a, 14b, 14c.

Figure 8:
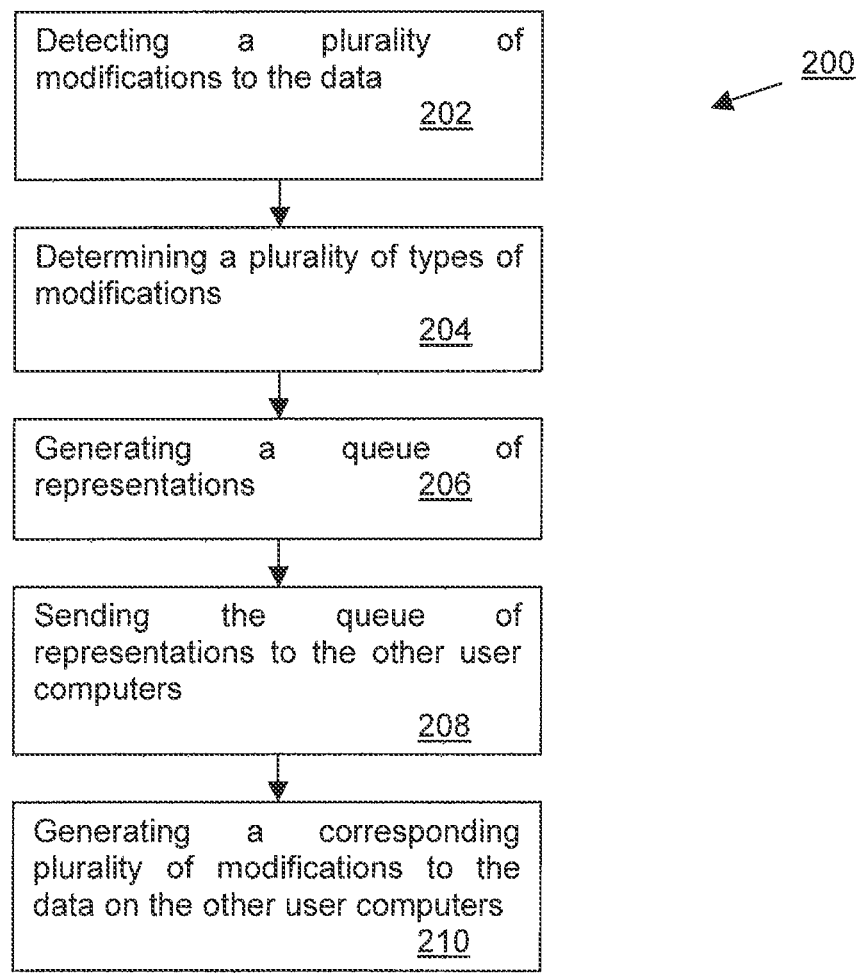
FIG. 8 is another flowchart diagram of an example method for facilitating the synchronization of data when multiple modifications are made to the data in accordance with at least one embodiment.

Reference is now made to FIG. 8, which illustrates a flowchart diagram of a method for facilitating the synchronization of editable data on two or more user computers when multiple modifications are made to the editable data in accordance with at least one embodiment. The method 200 of FIG. 8 is similar to the method 100 of FIG. 5 and will be described with reference to another example of modifications.

At step 202, system 10 detects a plurality of modifications to the editable data. As described above in relation to FIG. 5 a modification to the data such as bolding text data and may result in multiple modifications. System 10 is operable to detect input by user computer 14a, 14b, 14c via input device 26 and detect the plurality of modifications after a predetermined time duration has expired, such as 500 ms, after the last detected input. System 10 is operable to detect the modifications in other ways. For example, system 10 may compare a previous copy of the data to a current copy of the data to detect modifications and system 10 may also receive a request to synchronize the data from a user computer 14a, 14b, 14c and detect modifications at that time.

As another example of modifications, system 10 may detect further modifications made to "This is bold text!" by the same or another user computer 14a, 14b, 14c. System 10 may detect that the text data "bold" is deleted and the text object defining the text data "This is" is edited to add the text data "plain", such that the data reads "This is plain text!".

Figure 7:
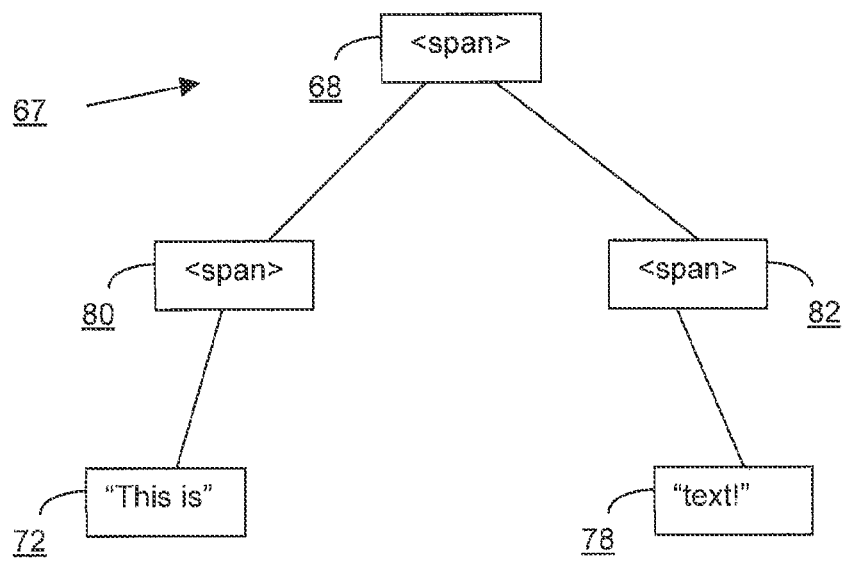
FIG. 7 is another diagram of data structures organized as connected trees of nodes in accordance with at least one embodiment.
Figure 7:
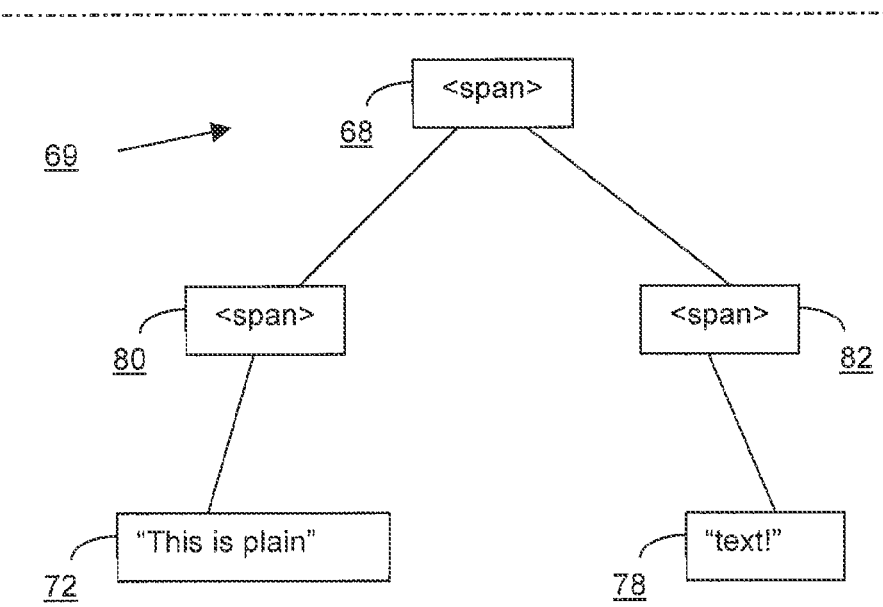

Reference will be made to FIG. 7, which illustrates another diagram of data structures organized as connected trees of nodes in accordance with at least one embodiment. Tree 67 illustrates the modification of deleting "bold" defined by the bold object and the text object represented in tree 66 as bold node 74 and text node 76. Tree 69 illustrates the modification editing the text object defining the text data "This is" represented by text node 72 to add the text data "plain". In addition, "plain" may be added to a new span node, or it may result in an edit to the other text node to include plain in its text data.

The data for "This is text!" may be represented in a data structure as:

```
<span class="SL_C_1933737_14074 Edit Creator1933737"><span
class="SL_C_1933737_14075 Edit Creator1933737">This is
</span><span
class="SL_C_1933737_14076 Edit Creator1933737"> text!
</span></span>
```

As an example, a log of the actions implemented by system 10 at the user computer that initiated the modification may be:

```
RemoveDeletedContainers:
SL_C_1933737_14077 was deleted with html <b
class="SL_C_1933737_14077 Edit Creator1933737" old="[B]bold"
coordinates="SL_C_1933737_14074,SL_C_1933737_14075,
SL_C_1933737_14076
FindChanges: SL_C_1933737_14076 children were changed
FindChanges: SL_C_1933737_14075 children were changed
FindChanges: SL_C_1933737_14074 children were changed
```

In this example, an example index includes both a token and positional value. The positional value may be defined using at least three nodes, such as (parent node, left sibling node, right sibling node).

At step 204, system 10 determines a plurality of types of modifications. For the simplified example, system 10 determines that an object has been deleted and a text object has been edited. Further, for embodiments where the index includes a coordinate that references sibling or parent nodes, then system 10 may detect that objects have changed whose sibling or parent is the deleted object. The modifications may be detected at only one of the user computers 14a, 14b, 14c or at different user computers 14a, 14b, 14c.

At step 206, system 10 generates a queue of representations by creating a representation for each modification of the plurality of modifications. Further details relating to creating the representation will be described in relation to FIGS. 9 and 10. For example, system 10 may generate separate representations for each type of modification. The following is a log of actions implemented by system 10 at the computer that initiated the change may be:

```
ModifyElement: SL_C_1933737_14076 with the html text!
ModifyElement: SL_C_1933737_14075 with the html This is
ModifyElement: SL_C_1933737_14074 with the html <span
class="SL_C_1933737_14075 Edit Creator1933737" old=
"[SPAN]This is "
coordinates="SL_C_1933737_14074,null,
SL_C_1933737_14076">This is</span><span
class="SL_C_1933737_14076 Edit Creator1933737" old=
"[SPAN] text!"
coordinates="SL_C_1933737_14074,SL_C_1933737_14075,
null"> text!</span>
RemoveElement: removing SL_C_1933737_14077
ModifyElement: SL_C_1933737_14075 with the html This is plain
```

A representation of the queue of representations may be:

```
Modify object: SL_C_1933737_14076 with the html text!
Modify object: SL_C_1933737_14075 with the html This is
Modify object: SL_C_1933737_14074 with the html <span
class="SL_C_1933737_14075" old="[SPAN]This is "
coordinates="SL_C_1933737_14074,null,
SL_C_1933737_14076">This is</span><span
class="SL_C_1933737_14076 Edit Creator1933737" old=
"[SPAN] text!"
coordinates="SL_C_1933737_14074,SL_C_1933737_14075,null">
text!</span>
Remove object: SL_C_1933737_14077
Modify object: SL_C_1933737_14075 with the html This is plain
```

At step 208, system 10 sends the queue of representations to the other user computers. The queue of representations may be a series of separate representations made on the same one of the user computers 14a, 14b, 14c or may be representations of modifications made on different user computers 14a, 14b, 14c and aggregated by system 10 to form the queue of representations.

At step 210, system 10 generates a corresponding plurality of modifications to the editable data on the other user computers using the queue of representations. System 10 parses and processes the queue of representations in order to generate the corresponding modifications. System 10 may apply the queue of representations in sequence to generate corresponding modifications in sequence. For the simplified example, system 10 deletes text data "bold" and adds text data "plain". System 10 is operable detect modifications made to data 62a in a browser 60a displayed on display 32 of user computer 14a (FIG. 2). System 10 may generate corresponding modifications to data 62c in a browser 60c displayed on display 32 of user computer 14c. If the browsers 60a, 60c are different then the data structure maintaining the data may be different and the system 10 is operable to generate, parse and process the queue of representations based on the type of browser 60a, 60c.

Figure 9:
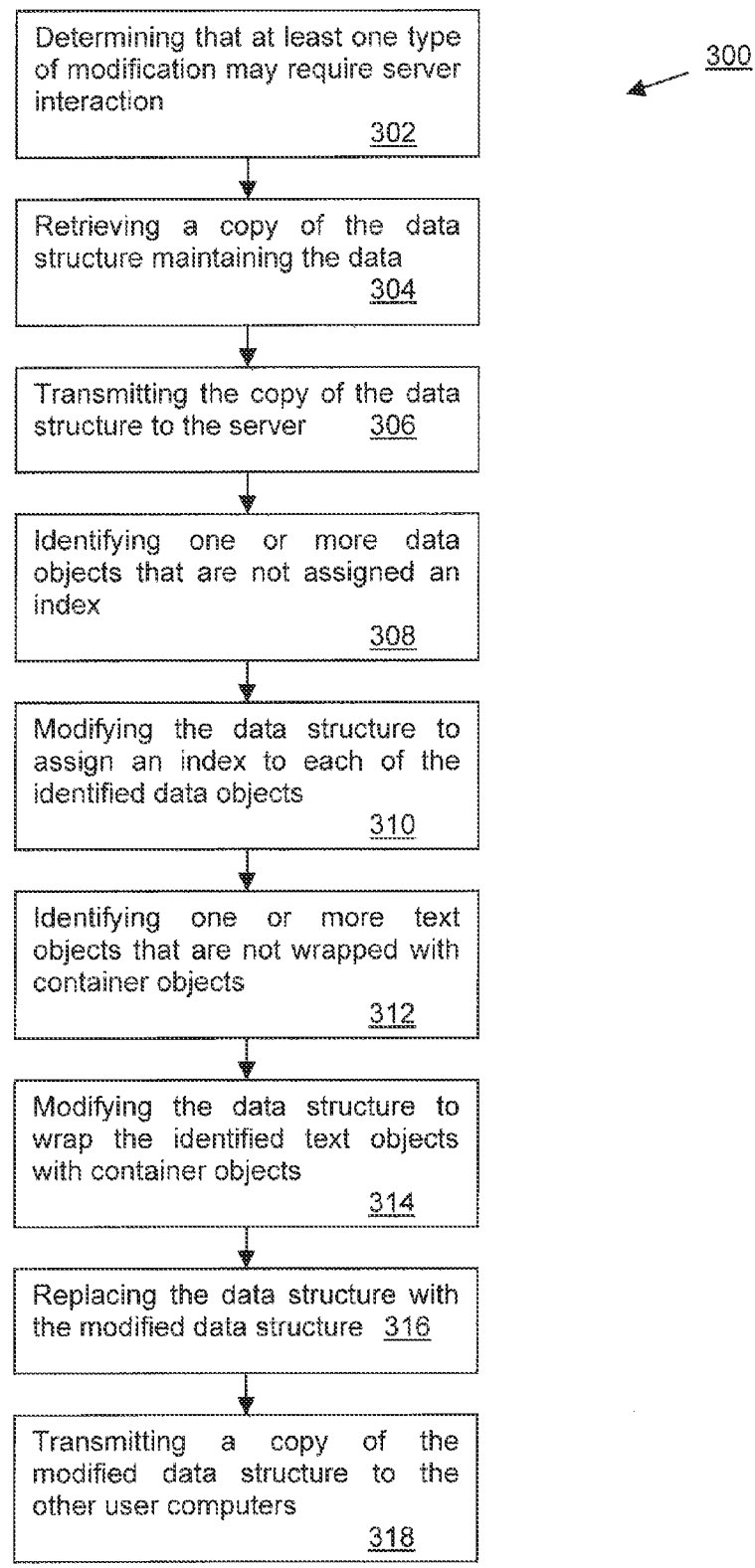
FIG. 9 is a flowchart diagram of an example method for creating a representation of a modification to data by changing more than a threshold amount of data in accordance with at least one embodiment.

Reference is now made to FIG. 9, which illustrates a flowchart diagram of a method 300 for creating a representation of a modification to data by changing more than a threshold amount of data in accordance with at least one embodiment.

At step 302, system 10 determines that generating the representation may require server 16 interaction. The server 16 may always generate the representation or may only generate the representation for specific types of modifications. For example, the at least one type of modification may be changing the data by more than a threshold amount of data, or that a "paste" has occurred to add objects to the data.

In some embodiments, system 10 is operable to create the representation of the modification by interacting with server 16. For example, changing a large amount of data, making complex modifications, or adding a large amount of data may require numerous operations to occur in order to determine all modification types and generate the representation. System 10 may interact with server 16 because the server 16 may be configured to efficiently execute all required operations for large or complex changes. If the network 12 is efficient then interacting with server 16 to generate the representation may not be subject to network delays.

At step 304, system 10 retrieves a copy of the data structure maintaining the data on the user computer 14a, 14b, 14c at which the modification was detected and initiated.

At step 306, system 10 transmits the copy of data structure to the server 16. While the server 16 implements steps of the method 100, additional modifications may be made to the data on the user computer 14a, 14b, 14c at which the modification was detected, and these modifications will still be detected by system 10 and synchronized.

At step 308, system 10 scans all objects of the data structure to locate any objects that are not assigned an index. If any are located, system 10 may determine that a type of modification is adding a new object to the data structure. When system 10 detects an object that is not assigned an index then system 10 is operable to recursively traverse all children nodes to assign indexes. That is, system 10 assigns indexes to the objects inner objects.

At step 310, system 10 modifies the data structure to assign each of the located elements with an index.

At step 312, system 10 scans all text objects of the data structure to identify any text objects that are not wrapped with a container object. At step 314, system 10 modifies the data structure to wrap the identified text objects with container objects. For example, referring back to FIG. 6, tree 65 illustrates text objects 72, 78 that are not wrapped with a container object, when the data was modified to bold text data in the middle of the text data defined by text objects 72, 78. Tree 66 illustrates text objects 72, 78 wrapped in span objects 80, 82. System 10 is operable to wrap text data with container objects to assign a token-based index to the text data.

In accordance with some embodiments, system 10 is operable to identify one or more text objects defining text data that is longer than a threshold amount. System 10 sub-divides the identified text objects by sub-dividing the text data of each of the identified text objects into text objects defining text data that are less than the threshold amount. System 10 modifies the data structure to wrap the divided text objects with container objects.

At step 316, system 10 transmits the modified data structure to the user computer 14a, 14b, 14c at which the modification was detected and replaces the copy of the data structure transmitted to the server 16 with the modified data structure.

At step 318, system 10 transmits a copy of the modified data structure to other user computers 14a, 14b, 14c and indicates in the representation that the modified data structure should replace the data structure maintaining the data on the other user computers. System 10 uses the modified data structure to generate a corresponding modification on the other user computers 14*a*, 14*b*, 14*c*. System 10 is operable to implement steps 316 and 318 at the same time.

In accordance with some embodiments, system 10 is operable to display a caret on each user computer displaying the editable data, where the caret is operable to move to different positions within the editable data. System 10 is operable to, for each of user computer, before generating the corresponding modification to the editable data, store a position of the caret. System 10 is operable to, after generating the corresponding modification to the editable data, display the caret at the stored location. That way, the caret will be displayed at the same location on the user computer 14*a*, 14*b*, 14*c* at which the modification was detected, even after the modified data structure replaces the data structure that was originally transmitted to the server 16. System 10 may store the position of the caret by inserting a place marker in the data structure. The place marker may include an attribute that indicates that it is the place marker for the caret position. When system 10 re-displays the modified data structure then system 10 is operable to use the place marker or otherwise stored position to re-position the caret.

Figure 10:
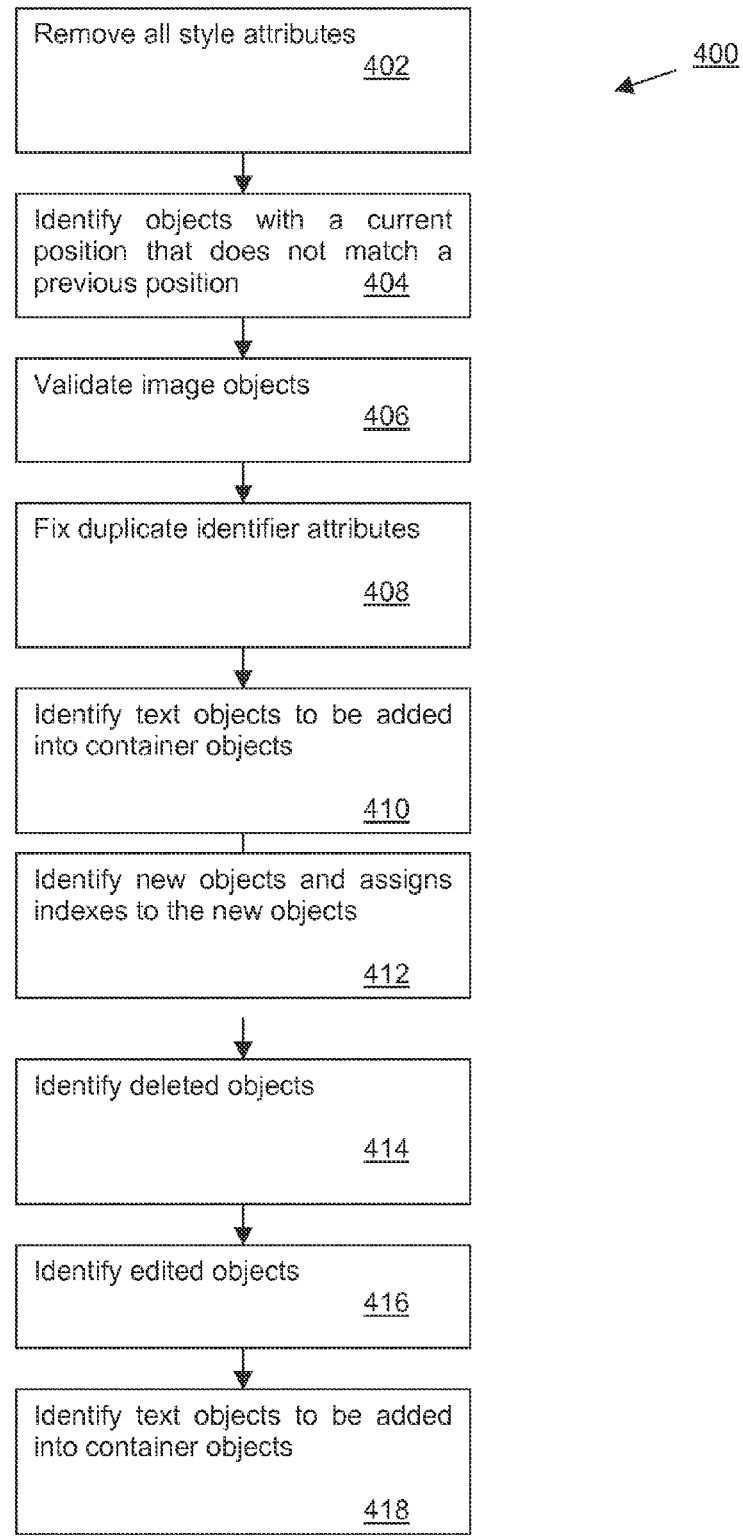
FIG. 10 is a flowchart diagram of an example method for creating a representation of a modification to data in accordance with at least one embodiment.

Reference is now made to FIG. 10, which illustrates a flowchart diagram of a method 400 for creating a representation of a modification to data in accordance with at least one embodiment.

At step 402, system 10 optionally removes all style attributes. The data structure may associate each object with a style attribute, and the system 10 is operable to strip all style attributes from all objects except those objects where the style attribute has been explicitly allowed. In this example, style may refer to all HTML classes and inline style that may not be supported by all computing applications used to display the data, such as web browsers.

At step 404, system 10 identifies objects associated with a current position that does not match its previous position. In accordance with some embodiment, at the computer at which the modification was detected, the assigned index includes a coordinate for each object, which comprises a previous position and a current position. The previous position is a position of the object in relation to other objects of the data before detecting the modification. The current position is a position of the object in relation to other objects of the editable data after detecting the modification. System 10 is operable to create a representation of the at least one modification by identifying one or more objects assigned to an index having a coordinate with a previous position that does not match a current position. In some embodiments, system 10 is further operable to indicate in the representation that each of the one or more identified objects should be moved from the previous position to the current position.

System 10 may identify an object with a current position that does not match its previous position when the modification involved moving the object from the previous position to the current position. As another example, the position of an object may be defined in relation to other objects in the data structure. If the other objects are updated or moved then this in turn may change the position of the object. For example, the coordinates of an object may be defined with reference to siblings or parent objects. If a new sibling to a given object is added, for example, system 10 will determine that, for the given object, the current position is different than the previous position, and indicate in the representation that the given object's position should be updated to the current position. As another example, when an object is changed, such as by bolding text data, then the change may result in the object being wrapped in a container object. This may also change the position of the object, as the object now has a new parent node, the container object.

At step 406, system 10 is operable to validate image objects that are added to the data. The data structure may include one or more image objects referencing image data. The system 10 is operable to scan the objects to identify if the image data referenced by an image object is stored on an external server. If so, system 10 is operable to store a copy of the image data on an internal server, and modifying the image object to reference the copy of the image data stored on the internal server. System 10 indicates in the representation that the image object should be modified to reference the copy of the image data stored on the internal server. That is, system 10 notifies the other user computers 14*a*, 14*b*, 14*c* that a new image object is added to the data where the new image object references the image data on the internal server.

At step 408, system 10 fixes objects having duplicate indexes. System 10 scans the data structure to identify whether there are two or more objects are assigned to the same index. System 10 modifies the data structure to assign different indexes to each of the identified two or more objects. That is, system 10 modifies the data structure to assign indexes that are different from each other to the identified objects. For example, one identified object may keep the same index, while the other identified object may be assigned a new index. As another example, both identified objects may be assigned new indexes. System 10 indicates in the representation that the two or more identified objects assigned to the same index should be assigned to the different indexes. In some example embodiments, system 10 can notify the other user computers 14*a*, 14*b*, 14*c* to insert a new object with the outerHTML at the coordinates of the new object. System 10 uses this as a verification mechanism to ensure that there are not duplicate indexes.

This may occur when the modification type involves a copy and paste of an object since the index may include a token and the same token may reference the original object and the copied object. It may also occur when system 10 splits an object into two objects having the same class. As another example, an object may be added twice, once when the data structure is sent to the server 16 for modification and in the meantime another user computer 14*a*, 14*b*, 14*c* adds the same object.

In some embodiments, system 10 may assume that the first object with the index can keep the index, and all other later objects with the same index must change the index to a different index. When the index is updated, then system 10 treats this update as if new objects were inserted into the data structure and sends a representation of the modification referencing the new objects and the new indexes.

At step 410, system 10 identifies text objects to be wrapped in container objects. For example, text data may be a specific type of object that may not be associated with particular attributes. It may be desirable to associate the text data with the particular attributes and so the text data is wrapped in a container object that can be associated with particular attributes. System 10 is operable to scan all the data structure for text data to be wrapped in container objects.

For example, system 10 is operable to traverse each node in the tree representation of the data structure to identify all nodes that have more than one children node and at least one child node that is a text object. For each identified node, for all the children nodes that are text objects, system 10 adds a new container object at the position of the text object, and defines the text object as the child node to the new container object. Further, system 10 indicates in the representation that the modification comprises adding one or more new container objects at the position of the text object and that the text object is defined as the child node to the new container object. In some example embodiments, system 10 can notify the other user computers 14a, 14b, 14c to make a corresponding update using a representation. For example, system 10 may create a representation that instructs the other user computers 14a, 14b, 14c to insert the new container object with the outerHTML at the coordinates of the new object.

At step 412, system 10 identifies objects that are not assigned an index. In some cases, an object may not be assigned an index if it was added to the data and system 10 is operable to determine that the at least one type of modification comprises adding the identified objects to the editable data. There may be other reasons why an object is not assigned an index, such as a paste, dynamic HTML, drag in, a bug or mistake. A user computer 14a, 14b, 14c can send a call out to other user computers 14a, 14b, 14c or server 16 for indexes for the object, such as the parent node and sibling nodes.

For each of the identified objects, system 10 is operable to modify the data structure to associate the object with a new index. System 10 is further operable to determine a position for the object relative to other objects of the editable data. This index may include this position, as well as a token. System 10 is operable to indicate in the representation that the object should be added to the editable data at the determined position. In some example embodiments, system 10 can notify the other user computers 14a, 14b, 14c with a representation that instructs the other user computers 14a, 14b, 14c to insert the new object at the position. As another example the representation may instructs the other user computers 14a, 14b, 14c to insert the new object with the outerHTML at the coordinates of the new object.

At step 414, system 10 identifies objects that have been deleted. System 10 is operable to identify an index assigned to an object that no longer exists in the data structure. System 10 indicates in the representation that the object assigned to the identified index should be deleted from the editable data. That is, system 10 can notify the other user computers 14a, 14b, 14c with a representation that instructs the other user computers 14a, 14b, 14c to delete an object assigned to the identified index.

At step 416, system 10 identifies objects that have been edited or changed. System 10 is operable to associate one or more objects with values. For example, the value of a text object may be the text data "This is" and the value of a container object may be the aggregate values of all objects in that container object.

For the one or more objects associated with values, system 10 is operable to associate an object with a previous value before detecting the modification and a new value after detecting the modification. System 10 is operable to identify an object that after detecting the modification, is associated with a new value that does not match its previous value before detecting the modification. In such a case, system 10 determines that one modification comprises editing an object of the editable data. System 10 indicates in the representation that the identified object has been edited to the new value. System 10 may indirectly indicate this by including the value of a container object that holds the object whose value has changed, as the value of the container object may be an aggregate value that includes the object's value.

In accordance with some embodiments, the objects may be serialized into strings, and system 10 is operable to identify objects that have been edited by serializing each object of the data structure into strings. System 10 recalls a first version of each object's serialized string before the modification. System 10 determines a second version for each object's serialized string after detecting a modification. System 10 identifies an object having a first version of a serialized string that does not match a second version of a serialized string. Upon making such identification, system 10 determines that the at least one type of modification comprises editing an object of the editable data. Once detecting that the two versions of serialized strings do not match, system 10 is operable to use the serialized string to determine the differences between the serialized strings. System 10 indicates in the representation that the object should be modified based on the differences between the two versions of the serialized strings. For example, the representation may include different attributes, node types, the innerHTML for the object, and so on.

In some embodiments, system 10 detects that the change was to the object itself (e.g. the node type changes or an attribute) then system 10 can notify the other user computers 14a, 14b, 14c to update their object using the representation that instructs the other user computers 14a, 14b, 14c to update their copy of the object with the updated object. For example, system 10 can notify the other user computers 14a, 14b, 14c to replace their copy of the value with the outerHTML of the new object value. If the change was to the children of the object, then in some example embodiments, system 10 can notify the other user computers 14a, 14b, 14c to replace their inner HTML of the element with the innerHTML of the updated object. System 10 is operable to update the serialized string and coordinates of each object.

At step 418, system 10 identifies new text objects to be wrapped in container objects. System 10 identifies the root node of the data structure to be synchronized and defines the root node as a container object. System 10 is operable to identify all children nodes to the root node that are text objects. For each text object, if a text object is next to a container object in the data structure, system 10 is operable to add the editable text data defined by the text object as a value for the container object and delete the text object. System 10 indicates in the representation that the modification comprises editing or appending the children objects of the container object with the text data of the text object. Otherwise, system 10 wraps the text node in a container object assigned to a new index. For example, if the text object is next to a span object, then system 10 adds its contents into that span object and deletes the text object. System 10 can notify the other user computers 14a, 14b, 14c to update the object using a representation. For example, system 10 can notify the other user computers 14a, 14b, 14c to replace their innerHTML of the object with the innerHTML of the text object. Otherwise, system 10 is operable to wrap the text object in a container object with a new index. System 10 can notify the other user computers 14a, 14b, 14c to insert a new object with the OuterHTML at the coordinate. System 10 is operable to wrap text objects in container objects because in some embodiments a text object may not be associated with attributes directly and so system 10 wraps such text objects in container objects that can be associated with the attributes.

In accordance with embodiments described herein, system 10 is operable to generate a representation that includes interface instructions relating to how to generate and display a corresponding modification on one or more user computers 14a, 14b, 14c. The interface instructions may define the front end formatting for the data and instruct each user computer 14a, 14b, 14c how to display the data and modifications thereto. The interface instructions may include a style sheet, template, display instructions, rendering instructions, code to modify a document object model for the data. Each user computer 14a, 14b, 14c may display the data using different display mechanisms or tools and the interface directions act as an interface between these different display mechanisms. For example, one user computer 14a, 14b, 14c may display the data using a first type of web browser and another user computer 14a, 14b, 14c may display the data using a second type of web browser, and system 10 is operable to use the interface directions to display the data consistently on both web browsers.

The interface instructions may be specific to a user computer 14a, 14b, 14c and may vary for different user computers 14a, 14b, 14c, or may generally apply to all user computers 14a, 14b, 14c. The interface instructions may be specific to the data to which the modifications are made, and may depend on the format of the data, the type of data, the technology used to display the data (such as a document object model), the type of application used to display the data, the type of device the user computer 14a, 14b, 14c is (such as a mobile device) and so on. For example, the data may be displayed on one or more user computers 14a, 14b, 14c using a particular type of web browser and the interface instructions may instruct the particular type of web browser how to display the data. The interface instructions may vary for different types of web browsers. As another example, the data may be modified using a social networking application such as Twitter™ and the interface instructions may instruct the user computers 14a, 14b, 14c that the data was modified using the social networking application and to display the data in a way that is specific to the social networking application.

In accordance with embodiments described herein, system 10 is operable to generate different versions of the same representation in formats compatible with different user computers 14a, 14b, 14c. System 10 is operable to generate different versions of the same representation by translating a representation into different formats. Each user computer 14a, 14b, 14c may establish a connection to system 10 and instruct system 10 as to its preferred format of representation in a header file, address file, a message file and so on. System 10 is also operable to send multiple versions of the same representation to each user computer 14a, 14b, 14c so that each respective user computer 14a, 14b, 14c can use whatever format is compatible or preferred. System 10 is operable to determine which format or version to use using an address for the user computer 14a, 14b, 14c associated with a request and so on. The user computers 14a, 14b, 14c may be different devices and the different versions and formats may be specific to different devices.

In accordance with embodiments described herein, system 10 is operable to translate the content of the data to create different versions of the data and different sizes of the data. For example, system 10 is operable to translate the data into different languages using a repository of dictionaries. System 10 is operable to query user computers 14a, 14b, 14c to determine the preferred language for each and store the preferred language in association with an identifier for the respective user computer 14a, 14b, 14c. System 10 is operable to translate the data into different sizes to accommodate different size displays of user computers 14a, 14b, 14c. For example, one user computer may be a mobile device with a small size display and another computer may be a desktop computer with a standard size display, and system 10 is operable to provide two different versions of the same data to each based on the display sizes.

In accordance with embodiments described herein, system 10 is operable to provide the data with the modifications to one or more user computers 14a, 14b, 14c for display. The data with the modifications that may be displayed on one or more user computers 14a, 14b, 14c may be referred to herein as a publication. The one or more user computers 14a, 14b, 14c may have different permissions with respect to the data. For example, some user computers 14a, 14b, 14c may have read only permissions to only view the data but not make modifications to the data. Some user computers 14a, 14b, 14c may have write permissions so that they can make modifications to the data. Other user computers 14a, 14b, 14c may have read and write permissions so that they can view the data and make modifications to the data.

Figure 11:
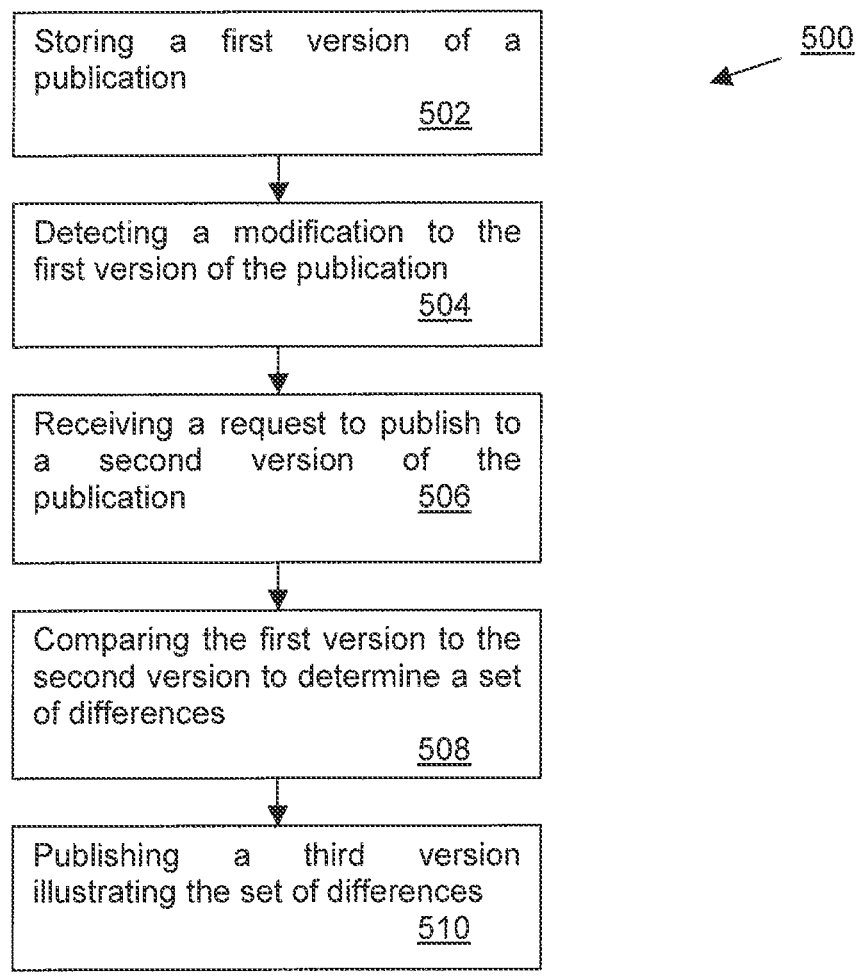
FIG. 11 is a flowchart diagram of an example method for illustrating modified data in accordance with at least one embodiment.

Reference is now made to FIG. 11, which illustrates a flowchart diagram of a method for illustrating a modified publication displayed in accordance with at least one embodiment.

At step 502, system 10 stores a first version of the data. The data may include objects such as textual objects and media objects. Data and modifications thereto that are capable of display on one or more user computers 14a, 14b, 14c may be referred to herein as a publication.

The system 10 is operable to store different versions of the data on server 16, user computers 14a, 14b, 14c, or both. For example, a first version of the data may be the data before any modification is detected, a second version of the data may the data after a first modification is detected, a third version of the data may be the data after a second modification is detected, and so on. System 10 is operable to store the first, second, third version of the data on server 16, user computers 14a, 14b, 14c, or both. System 10 may store each different version of the data on server 16 to maintain a central repository of all versions of the data and modifications thereto.

At step 504, system 10 detects a modification to the first version of the data. The data with the modification may be referred to as a second version of the publication.

System 10 is operable to store the second version of the data on server 16, user computers 14a, 14b, 14c, or both. After each time a modification is detected, system 10 is operable to store a corresponding version of the data on the server 16 to maintain a central repository of all versions of the data and modifications thereto. System 10 maintains a central repository to track how the data has been modified over time. System 10 is operable to associate an author with each modification and track who modified the data over time, and how.

At step 506, system 10 may receive a request to publish or may automatically publish the second version of the data. Publishing the data may be displaying the data on one or more user computers 14a, 14b, 14c with at least read permissions.

For example, before displaying data and modifications thereto on a user computer 14a, 14b, 14c, system 10 may receive a request to publish the data with the modification(s) (the second version) from the user computer 14a, 14b, 14c. That is, the user computer 14a, 14b, 14c may poll system 10 for modifications to the data or a current version of the data, periodically, randomly and so on. System 10 may also automatically display data and modifications thereto on a user computer 14a, 14b, 14c without receiving a request from the user computer 14a, 14b, 14c. That is, system 10 may push an updated version of the data to a user computer 14a, 14b, 14c displaying an earlier version of the data.

System 10 is operable to receive a request directly from a first user computer 14a, 14b, 14c. System 10 is also operable to receive a request from a first user computer 14a, 14b, 14c via a second user computer 14a, 14b, 14c acting as a relay. For example, a first user computer 14a, 14b, 14c may send a request to a second user computer 14a, 14b, 14c for an updated version of the data. The second user computer 14a, 14b, 14c may have an updated version of the data and respond to the request directly. The second user computer 14a, 14b, 14c may also forward the request to system 10 to obtain an updated version of the data from server 16 or another user computer 14a, 14b, 14c.

In accordance with some embodiments, system 10 receives a request from a first user computer 14a, 14b, 14c at a load balancing server which may also be referred to as a caching server, a reverse proxy server, and so on. The load-balancing server may be the server 16 or may be a separate server (not shown) connected to network 12. The load-balancing server is operable to provide the request to server 16. System 10 may use a load balancing server to manage requests to scale to a large number of user computers 14a, 14b, 14c that may request an updated version of the data. For example, the data may be a news article that may be displayed on thousands of user computers 14a, 14b, 14c and system 10 may use the load-balancing server to efficiently manage the requests. That way, system 10 can reserve the use of server 16 to manage the creation of representations of modifications, and to store and manage the different versions of the data. Upon receiving one or more requests, load balancing server can send a request to server 16 for the latest version of the data, and in response server 16 can provide the latest version of the data to load balancing server. Load balancing server can cache or temporarily store the latest version of the data to respond to requests for a set time duration. Upon expiration of the time duration, load-balancing server may send a request to server 16 for the latest version of the data to update the cache. Server 16 may also automatically provide updated versions of the data to load balancing server to update its cache. Load balancing server can also obtain updated versions of the data from other user computers 14a, 14b, 14c to respond to requests.

In accordance with at least some embodiments, system 10 is operable to publish and display data through the publishing platform ScribbleLive™ (http://www.scribblelive.com/). System 10 is further operable to publish and display data through the use of dynamic templating.

In accordance with at least some embodiments, in order to publish data and modifications thereto, a current version of the data may be published to server 16 (or another server not shown) for retrieval by user computers 14a, 14b, 14c for display thereon. The server 16 may also publish computer-readable instructions, such as JavaScript code, for causing the user computers 14a, 14b, 14c to periodically poll for updates to the data (e.g., in the form of representations of modifications to the data or another indication that modifications have been made).

Subsequently, the system 10 may periodically determine whether modifications to the data have been made during a predetermined interval and whether representations of the modifications have been transmitted at step 110. If modifications have been made, the system 10 is operable to transmit the representation to a server (server 16 or another server not shown), for retrieval by the user computers 14a, 14b, 14c. The system 10 may also transmit an indication that modifications have been made (e.g., a timestamp).

Accordingly, the user computers 14a, 14b, 14c, while periodically polling for modifications to the data, can determine that modifications have been made and retrieve the representation of the modifications. Based on the representation, at step 112 system 10 can modify each user computer's 14a, 14b, 14c version of the content, resulting in a modified version of the content at the user computers 14a, 14b, 14c.

At step 508, system 10 determines and generates a set of differences between the first version of the data and a second version of the data. For example, the first version of the data may be the version that is currently displayed on the user computer 14a, 14b, 14c associated with the request and the second version of the data may be an updated version of the data after one or more modifications thereto.

System 10 is operable to generate the set of differences in any format compatible with the user computer that initiated the request, such as JavaScript for example. System 10 may determine the set of differences by comparing the first version of the data with the second version of the data. System 10 may also determine the set of differences using a representation of a modification. For example, whenever a user computer 14a, 14b, 14c transmits a representation of a modification, the user computer 14a, 14b, 14c may also transmit a copy of the representation to the server 16. Server 16 may store the representation and may also generate a second version of the data by generating a corresponding modification to a first version of the data using the representation. That is, the representation is the difference between the first version and the second version.

The first version of the data may be specific to the user computer 14a, 14b, 14c, such as the version of data that is displayed on the user computer 14a, 14b, 14c, for example. The second version may be the latest (or later) version of the data, or an earlier version of the data. For example, if system 10 receives a request to publish or update the data then system 10 is operable to determine what version of the data that is currently displayed on the user computer 14a, 14b, 14c that initiated the request and compare that version to the latest version of the data to determine the set of differences.

System 10 is operable to store the set of differences to track how the publication is modified over time. System 10 is operable to store versions of the data and representations of modifications on the server 16 in order to maintain a central repository of all versions of the data and modifications thereto.

At step 510, system 10 generates a third version of the data illustrating the first set of differences and provides the third version on the user computer 14a, 14b, 14c that initiated the request. For example, system 10 illustrates the differences by marking up a version, highlighting a version, animating a version, providing a description of the difference, or otherwise illustrating them. System 10 optionally publishes the third version on the user computer 14a, 14b, 14c that initiated the request. System 10 may illustrate the progression of how the data is modified. System 10 may generate a third version of the data in a way that illustrates multiple versions of the data. For example, a first version of the data may be illustrated in one color, a first set of modifications to the first version of the data may be illustrated in another color, and a second set of modifications to the data may be illustrated in another color.

System 10 is further operable to detect an author of one or more modifications to the data and optionally publishing a version of the data illustrating the differences created by the one or more modifications and indicating the author of each modification. System 10 can also store the set of differences in association with the author that made the modification.

System 10 is further operable to store the third version of the publication. System 10 may detect another modification to the data, wherein the publication with the modification is a fourth version of the publication, and so on. System 10 may receive a request to publish the fourth version publication. System 10 determines a second set of differences, and so on. System 10 publishes a fifth version of the publication illustrating the differences. The first set of differences may be illustrated differently than the second set of differences. If different authors made the modifications, the first set of differences indicates the first author and the second set of differences indicates the second author. System 10 is operable to store each set of differences in association with the respective author.

The embodiments have been described here by way of example only. Various modification and variations may be made to these exemplary embodiments without departing from the spirit and scope, which is limited only by the appended claims.

We claim:

1. A method for facilitating synchronization of editable data on two or more user computers, the method comprising:
   assigning an index to one or more objects maintained in a data structure, wherein each index provides an address for an object within the data structure and the object representing data on two or more user computers;
   detecting at least one type of modification to the data initiated on one user computer;
   updating one or more objects in the data structure based on the modification responsive to amount of the modification to the data exceeding a threshold value;
   creating a representation of the detected type of modification, wherein the representation comprises a reference to one or more indexes assigned to the one or more updated objects representing a modified data structure, a modified data structure received from a computer server including an indication to replace the data structure maintained on the user computers by the modified data structure, the computer server adapted to modify the data structure by assigning an index to each object not previously assigned with an index;
   transmitting the representation for generating a corresponding modification to the data on other user computers; and
   generating the corresponding modification to the data on the other user computers using the representation by:
      displaying the data and modifications to the data on each of the two or more user computers, the modification indicated on the display on each of the user computers
      displaying a caret on each user computer displaying the editable data and storing a position of the caret within the editable data, wherein the caret is operable to move to different positions within the editable data; and
      for each of the user computers, responsive to generating the corresponding modification to the data, displaying the caret at the stored position.

2. The method of claim 1, further comprising:
   determining the at least one type of modification; and
   updating one or more objects in the data structure based on the at least one type of modification wherein the representation comprises a reference to the at least one type of modification.

3. The method of claim 1, wherein the representation comprises data relating only to the at least one modification to the data.

4. The method of claim 1, wherein the objects maintained in the data structure are organized in the data structure as a connected tree of nodes, each node in the tree corresponding to an object, wherein each node in the connected tree has zero or more parent nodes, zero or more sibling nodes, and zero or more children nodes, and wherein the connected tree comprises a root node having zero parent nodes.

5. The method of claim 1, wherein an index comprises a unique token.

6. The method of claim 1, wherein the data structure maintains each object in a position in relation to other objects, and wherein an index of an object comprises a coordinate storing the position of the indexed object in relation to the other objects.

7. The method of claim 1, where the at least one type of modification is selected from a group comprising of: deleting an object from the data, adding an object to the data, editing an object of the data, moving an object from a first position to a second position, and changing the data by more than a threshold amount of data.

8. The method of claim 1, wherein creating a representation of the at least one modification further comprises:
   identifying one or more objects that are not associated with an index;
   for each of the identified one or more objects:
      modifying the data structure to assign a new index to the object;
      determining a position for the object relative to other objects of the editable data; and
      indicating in the representation that the object should be added to the data at the determined position.

9. The method of claim 1, wherein creating a representation of the at least one modification using further comprises:
   identifying an index assigned to an object that no longer exists in the data structure; and
   indicating in the representation that the object assigned to the identified index should be deleted from the editable data.

10. The method of claim 1, wherein the data structure associates one or more objects with a previous value before detecting the modification and a current value after detecting the modification, and wherein creating a representation of the at least one modification further comprises:
    identifying the one or more objects associated with a current value that does not match its previous value before detecting the modification; and
    indicating in the representation that the identified object has been in edited from its previous value to its new value.

11. The method of claim 1, wherein each of the objects is configured to be serialized into strings, and wherein the method further comprises:
    before detecting the modification, storing a first version of each object's serialized string;
    wherein creating a representation of the at least one modification further comprises:
    determining a second version for each object's serialized string;
    identifying an object having a first version of a serialized string that does not match a second version of a serialized string; and
    indicating in the representation that the object should be changed to the second version of the serialized string.

12. The method of claim 1, wherein creating a representation of the at least one modification further comprises:
    identifying two or more objects assigned to the same index;
    modifying the data structure to assign different indexes to each of the identified two or more objects;
    indicating in the representation that the two or more identified elements assigned to the same index should be associated with the different indexes.

13. The method of claim 1, further comprising:
    detecting a plurality of modifications to the editable data;
    generating a queue of representations by creating a representation for each modification of the plurality of modifications; and sending the queue of representations to the other user computers, the queue of representations for use in generating a corresponding plurality of modifications to the data on the other user computers.

14. The method of claim 1, wherein the data structure associates one or more objects with a style attribute, and wherein the method further comprises stripping style attributes from the one or more objects except those objects where the style attribute has been explicitly allowed.

15. The method of claim 1, wherein the objects comprise an image object referencing image data and wherein the method further comprises:
    determining that the image data referenced by the image object is stored on an external server;
    storing a copy of the image data on an internal server;
    modifying the image object to reference the copy of the image data stored on the internal server; and
    indicating in the representation that the image object should be changed to reference the copy of the image data stored on the internal server.

16. The method of claim 1, further comprising illustrating modified data displayed on one or more user computers, illustrating the modified data comprising:
    storing a first version of data comprising a plurality of objects including textual objects and media objects;
    detecting a modification to the first version of the data, wherein the data with the modification is a second version of the data;
    receiving a request to publish the data;
    determining a first set of differences between the first version of the data with the second version of the data; and
    publishing a third version of the data illustrating the first set of differences.

17. The method of claim 16, further comprising:
    detecting an author of the modification to the data;
    publishing the third version of the data indicating the author of the modification.

18. The method of claim 16, further comprising:
    storing the third version of the data;
    detecting another modification to the data, wherein the data with the other modification is a fourth version of the data;
    receiving a request to publish the fourth version of the data;
    determining a second set of differences between the third version of the data with the fourth version of the data; and
    publishing a fifth version of the data illustrating the second set of differences.

19. The method of claim 18, further comprising:
    publishing the fifth version of the publication illustrating the first set of differences and the second set of differences, wherein the first set of differences is illustrated differently than the second set of differences.

20. The method of claim 16, further comprising:
    detecting a first author of the modification to the first version of the data;
    detecting a second author of the modification to the second version of the data; and
    publishing a third version of the data illustrating the differences and the author of the modification, wherein a first set of differences indicates the first author and a second set of differences indicates the second author.

21. The method of claim 20, further comprising animating to illustrate the first set of differences and indicating a description of the first set of differences.

22. A method for facilitating synchronization of data on two or more user computers, the method comprising:
    assigning an index to one or more objects maintained in a data structure, wherein each index provides an address for an object within the data structure and the object representing data on two or more user computers, wherein the objects comprise text objects defining editable text data and wherein the objects comprise container objects defining a container for one or more objects, wherein the container objects are associated with a value, wherein the objects maintained in the data structure are organized in the data structure as a connected tree of nodes, each node in the tree corresponding to an object, wherein each node in the connected tree has zero or more parent nodes, zero or more sibling nodes, and zero or more children nodes, and wherein the connected tree comprises a root node having zero parent nodes;
    detecting at least one type of modification to the data initiated on one user computer;
    updating one or more objects in the data structure based on the modification responsive to amount of the modification to the data exceeding a threshold value;
    traversing each node in the tree of nodes to identify all nodes that have more than one children nodes and at least one child node that is a text object;
    for each identified node, for all children nodes that are text objects, add a new container object at the position of the text object, and define the text object as the child node to the new container object;
    creating a representation of the detected type of modification, wherein the representation comprises a reference to one or more indexes assigned to the one or more updated objects representing a modified data structure, a modified data structure received from a computer server including an indication to replace the data structure maintained on the user computers by the modified data structure, the computer server adapted to modify the data structure by assigning an index to each object not previously assigned with an index;
    transmitting the representation for generating a corresponding modification to the data on other user computers; and
    indicating in the representation that the modification comprises adding one or more new container objects at the position of the text object and that the value associated with the new container node is the text object.

23. The method of claim 22, wherein the data structure maintains each object in a position in relation to other objects, and wherein an index of an object comprises a coordinate storing the position of the indexed object in relation to the other objects.

24. The method of claim 22, where the at least one type of modification is selected from a group comprising of: deleting an object from the data, adding an object to the data, editing an object of the data, moving an object from a first position to a second position, and changing the data by more than a threshold amount of data.

25. The method of claim 22, wherein creating a representation of the at least one modification further comprises:
    identifying one or more objects that are not associated with an index;
    for each of the identified one or more objects:
        modifying the data structure to assign a new index to the object;
        determining a position for the object relative to other objects of the editable data; and indicating in the representation that the object should be added to the data at the determined position.

26. The method of claim 22, further comprising:
detecting a plurality of modifications to the editable data;
generating a queue of representations by creating a representation for each modification of the plurality of modifications; and
sending the queue of representations to the other user computers, the queue of representations for use in generating a corresponding plurality of modifications to the data on the other user computers.

27. A method for facilitating synchronization of data on two or more user computers, the method comprising:
assigning an index to one or more objects maintained in a data structure, wherein each index provides an address for an object within the data structure and the object representing data on two or more user computers, wherein the objects maintained in the data structure are organized in the data structure as a connected tree of nodes, each node in the tree corresponding to an object, wherein each node in the connected tree has zero or more parent nodes, zero or more sibling nodes, and zero or more children nodes, and wherein the connected tree comprises a root node having zero parent nodes;
detecting at least one type of modification to the data initiated on one user computer;
updating one or more objects in the data structure based on the modification responsive to amount of the modification to the data exceeding a threshold value;
creating a representation of the detected type of modification, wherein the representation comprises a reference to one or more indexes assigned to the one or more updated objects representing a modified data structure, a modified data structure received from a computer server including an indication to replace the data structure maintained on the user computers by the modified data structure, the computer server adapted to modify the data structure by assigning an index to each object not previously assigned with an index;
identifying the root node of the data structure;
defining the root node as a container object;
identifying all children nodes to the root node that are text objects;
for each text object:
responsive to a text object being next to a container object in the data structure:
adding the editable text data defined by the text object as a value of the container object;
deleting the text object;
indicating in the representation that the modification comprises appending the children nodes of the container object with the text data of the text object; and
responsive to the text object being not next to a container object in the data structure, wrapping the text node in a container object assigned to a new index; and
transmitting the representation for generating a corresponding modification to the data on other user computers.

28. The method of claim 27, where the at least one type of modification is selected from a group comprising of: deleting an object from the data, adding an object to the data, editing an object of the data, moving an object from a first position to a second position, and changing the data by more than a threshold amount of data.

29. A method for facilitating synchronization of data on two or more user computers, the method comprising:
assigning an index to one or more objects maintained in a data structure, wherein each index provides an address for an object within the data structure and the object representing data on two or more user computers, wherein the data structure maintains each object in a position in relation to other objects, and wherein an index of an object comprises a coordinate storing the position of the indexed object in relation to the other objects;
detecting at least one type of modification to the data initiated on one user computer, wherein the coordinate of the assigned index for an object comprises a previous position and a current position, wherein the previous position is a position of the object in relation to other objects of the data before detecting the modification, and wherein the current position is a position of the object in relation to other objects of the editable data after detecting the modification;
updating one or more objects in the data structure based on the modification responsive to amount of the modification to the data exceeding a threshold value;
creating a representation of the detected type of modification, wherein the representation comprises a reference to one or more indexes assigned to the one or more updated objects representing a modified data structure, a modified data structure received from a computer server including an indication to replace the data structure maintained on the user computers by the modified data structure, the computer server adapted to modify the data structure by assigning an index to each object not previously assigned with an index, and wherein creating a representation of the at least one modification comprises:
identifying one or more objects assigned to an index having a coordinate with a previous position that does not match a current position;
indicating in the representation that each of the one or more identified objects should be moved from the previous position to the current position; and
transmitting the representation for generating a corresponding modification to the data on other user computers.

30. The method of claim 29, wherein the data structure maintains each object in a position in relation to other objects, and wherein an index of an object comprises a coordinate storing the position of the indexed object in relation to the other objects.

31. The method of claim 29, further comprising:
moving an object from a first position to a second position responsive to detected modification.

32. A method for facilitating synchronization of data on two or more user computers, the method comprising:
assigning an index to one or more objects maintained in a data structure, wherein each index provides an address for an object within the data structure and the object representing data on two or more user computers;
detecting at least one type of modification to the data initiated on one user computer;
updating one or more objects in the data structure based on the modification responsive to amount of the modification to the data exceeding a threshold value;
creating a representation of the detected type of modification, wherein the representation comprises a reference to one or more indexes assigned to the one or more updated objects representing a modified data structure, a modified data structure received from a computer server including an indication to replace the data structure maintained on the user computers by the modified data structure, the computer server adapted to modify the data structure by assigning an index to each object not previously assigned with an index, wherein creating a representation of the detected modification comprises:
- retrieving a copy of the data structure maintaining the data on the user computer at which the modification was detected and initiated;
- transmitting the copy of data structure to the computer server;
- receiving a modified data structure from the computer server at the user computer at which the modification was detected, wherein the computer server modified the copy of the data structure by assigning an index to each object that was not previously assigned an index;
- replacing the copy of the data structure transmitted to the server with the modified data structure;
- transmitting a copy of the modified data structure; and
- indicating in the representation that the modified data structure should replace the data structure maintaining the data on the other user computers; and
- transmitting the representation for generating a corresponding modification to the data on other user computers.

33. The method of claim 32, further comprising wrapping text objects that are not wrapped with associated container objects to generate the modified data structure.

34. The method of claim 32, further comprising:
- identifying one or more text objects defining text data that is longer than a threshold amount;
- sub-dividing the identified text objects by sub-dividing the text data of each of the identified text objects into text objects defining text data that is that are less than the threshold amount; and
- modifying the data structure to wrap the divided text objects with associated container objects.

35. A system for facilitating synchronization of editable data on two or more user computers, the system comprising:
- a modification module for:
  - assigning an index to one or more objects maintained in a data structure, wherein each index provides an address for an object within the data structure and the object representing data on two or more user computers;
  - detecting at least one type of modification to the data initiated on one user computer;
  - updating one or more objects in the data structure based on the modification responsive to amount of the modification to the data exceeding a threshold value;
  - creating a representation of the detected type of modification, wherein the representation comprises a reference to one or more indexes assigned to the one or more updated objects representing a modified data structure, a modified data structure received from a computer server including an indication to replace the data structure maintained on the user computers by the modified data structure, the computer server adapted to modify the data structure by assigning an index to each object not previously assigned with an index; and
- an output module for transmitting the representation for generating a corresponding modification to the data on other user computers;
- a modification module for generating the corresponding modification to the data on the other user computers using the representation by displaying the data and modifications to the data on each of the two or more user computers, the modification indicated on the display on each of the user computers; and
- a caret module for:
  - displaying a caret on each user computer displaying the editable data and storing a position of the caret within the editable data, wherein the caret is operable to move to different positions within the editable data; and
  - for each of the user computers, responsive to generating the corresponding modification to the data, displaying the caret at the stored position.

36. A non-transitory computer-readable storage medium storing computer program instructions executed by a computer processor for facilitating synchronization of editable data on two or more user computers, the computer program instructions comprising instructions for:
- assigning an index to one or more objects maintained in a data structure, wherein each index provides an address for an object within the data structure and the object representing data on two or more user computers;
- detecting at least one type of modification to the data initiated on one user computer;
- updating one or more objects in the data structure based on the modification responsive to amount of the modification to the data exceeding a threshold value;
- creating a representation of the detected type of modification, wherein the representation comprises a reference to one or more indexes assigned to the one or more updated objects representing a modified data structure, a modified data structure received from a computer server including an indication to replace the data structure maintained on the user computers by the modified data structure, the computer server adapted to modify the data structure by assigning an index to each object not previously assigned with an index;
- transmitting the representation for generating a corresponding modification to the data on other user computers; and
- generating the corresponding modification to the data on the other user computers using the representation by:
  - displaying the data and modifications to the data on each of the two or more user computers, the modification indicated on the display on each of the user computers
  - displaying a caret on each user computer displaying the editable data and storing a position of the caret within the editable data, wherein the caret is operable to move to different positions within the editable data; and p1 for each of the user computers, responsive to generating the corresponding modification to the data, displaying the caret at the stored position.

* * * * *